United States Patent
Lee et al.

(10) Patent No.: US 10,546,177 B2
(45) Date of Patent: Jan. 28, 2020

(54) FINGERPRINT VERIFICATION METHOD AND APPARATUS

(71) Applicant: Samsung Electronics Co., Ltd., Suwon-si (KR)

(72) Inventors: Hana Lee, Suwon-si (KR); Kyuhong Kim, Seoul (KR); Seon Min Rhee, Seoul (KR); Changkyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 15/926,024

(22) Filed: Mar. 20, 2018

(65) Prior Publication Data
US 2018/0365479 A1 Dec. 20, 2018

(30) Foreign Application Priority Data
Jun. 20, 2017 (KR) ........................ 10-2017-0078021

(51) Int. Cl.
*G06K 9/00* (2006.01)
(52) U.S. Cl.
CPC ..... *G06K 9/00087* (2013.01); *G06K 9/00013* (2013.01); *G06K 9/00026* (2013.01)
(58) Field of Classification Search
None
See application file for complete search history.

(56) References Cited

U.S. PATENT DOCUMENTS

| 5,825,924 A * | 10/1998 | Kobayashi | G06K 9/00067 382/219 |
| 7,142,699 B2 * | 11/2006 | Reisman | G06K 9/00087 382/124 |
| 8,300,904 B2 * | 10/2012 | Chen | G06K 9/00093 382/115 |

(Continued)

FOREIGN PATENT DOCUMENTS

| CN | 106295555 A | 1/2017 |
| JP | 3961439 B2 | 8/2007 |

(Continued)

OTHER PUBLICATIONS

Generating registration-free Cancelable Fingerprint Templates, Sharat Chikkerur et al., 978-1-4244-2730-7, IEEE, 2008, pp. 1-6 (Year: 2008).*

*Primary Examiner* — Jayesh A Patel
(74) *Attorney, Agent, or Firm* — NSIP Law

(57) ABSTRACT

A fingerprint verification method and a fingerprint verification apparatus performing the fingerprint verification method are disclosed. The fingerprint verification apparatus determines a first similarity between a query fingerprint image and each of registered fingerprint images, selects a target registered fingerprint image group from registered fingerprint image groups based on the first similarity, determines a second similarity between the query fingerprint image and each of registered fingerprint images in the target registered fingerprint image group based on matching relationship information between the registered fingerprint images in the target registered fingerprint image group, and determines whether fingerprint verification of the query fingerprint image is successful based on the second similarity.

13 Claims, 16 Drawing Sheets

(56) References Cited

U.S. PATENT DOCUMENTS

| | | | |
|---|---|---|---|
| 2002/0030359 A1* | 3/2002 | Bergenek | G06F 21/32 283/68 |
| 2002/0071598 A1* | 6/2002 | Kunieda | G06K 9/00067 382/125 |
| 2003/0169910 A1* | 9/2003 | Reisman | G06K 9/00087 382/124 |
| 2007/0031014 A1 | 2/2007 | Soderberg et al. | |
| 2008/0298646 A1* | 12/2008 | Wennergren | G06K 9/00087 382/124 |
| 2016/0132710 A1 | 5/2016 | Setterberg et al. | |

FOREIGN PATENT DOCUMENTS

| | | | | |
|---|---|---|---|---|
| JP | 3961439 B2 | * | 8/2007 | |
| JP | 4255999 B2 | * | 4/2009 | G06K 9/00087 |
| JP | 4255999 B2 | | 4/2009 | |
| JP | 4479350 B2 | | 6/2010 | |
| JP | 2011-86130 A | | 4/2011 | |
| JP | 2011086130 A | * | 4/2011 | |
| JP | 5977899 B1 | | 8/2016 | |
| KR | 10-0267263 B1 | | 11/2000 | |
| KR | 100267263 B1 | * | 11/2000 | |
| KR | 10-0446353 B1 | | 9/2004 | |
| KR | 100446353 B1 | * | 9/2004 | |
| KR | 10-1252454 B1 | | 4/2013 | |
| KR | 101252454 B1 | * | 4/2013 | |
| KR | 10-2016-0126842 A | | 11/2016 | |
| KR | 20160126842 A | * | 11/2016 | |

* cited by examiner

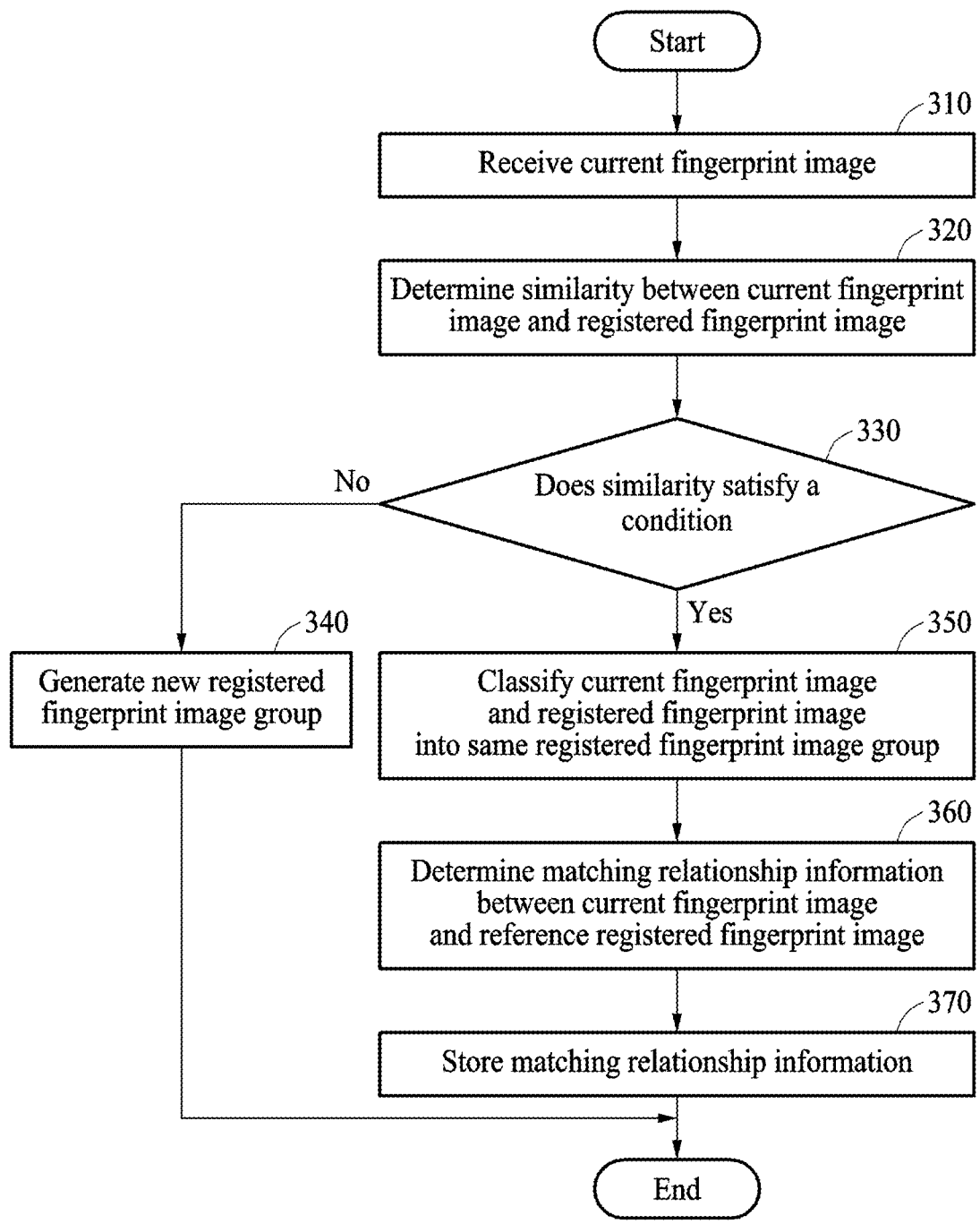

FINGERPRINT VERIFICATION METHOD AND APPARATUS

CROSS-REFERENCE TO RELATED APPLICATION(S)

This application claims the benefit under 35 USC § 119(a) of Korean Patent Application No. 10-2017-0078021 filed on Jun. 20, 2017, in the Korean Intellectual Property Office, the entire disclosure of which is incorporated herein by reference for all purposes.

BACKGROUND

1. Field

The following description relates to fingerprint verification.

2. Description of Related Art

Biometric authentication is used to authenticate a user by using the users' biological features, such as, fingerprints, irises, voices, facial features, blood vessels, or other biological characteristics. Such biological characteristics used in user authentication vary from person to person and rarely change during the lifetime of a user. Further, the biological characteristics pose a low risk of theft or imitation, providing high security authentication. Unlike fobs and other external objects, individuals do not need to exert any efforts to carry around such characteristics at all times, and thus, may not suffer inconvenience in using the biological characteristics. Fingerprint verification approaches are most commonly used due to their high level of convenience, security, and economic efficiency. A fingerprint verification approach may include comparing a fingerprint image of a user requesting user authentication to a previously registered fingerprint image and determining whether to authenticate the user based on a result of the comparing.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, there is provided a fingerprint verification method including receiving a query fingerprint image, determining a first similarity between the query fingerprint image and each of registered fingerprint images, selecting a target registered fingerprint image group from registered fingerprint image groups based on the first similarity, determining a second similarity between the query fingerprint image and each of registered fingerprint images in the target registered fingerprint image group based on matching relationship information between the registered fingerprint images in the target registered fingerprint image group, and determining whether fingerprint verification of the query fingerprint image is successful based on the second similarity.

The matching relationship information may include information associated with a matching rotation angle between the registered fingerprint images in the target registered fingerprint image group, and the matching rotation angle is determined in a fingerprint registration process.

The selecting of the target registered fingerprint image group may include selecting a target registered fingerprint image, which is a registered fingerprint image having a greatest first similarity among the registered fingerprint images, and selecting, to be the target registered fingerprint image group, a registered fingerprint image group including the target registered fingerprint image.

The determining of the second similarity may include determining a second similarity between the query fingerprint image and the target registered fingerprint image, and determining a second similarity between the query fingerprint image and another registered fingerprint image included in the target registered fingerprint image group based on a matching rotation angle between the query fingerprint image and the target registered fingerprint image, and the matching relationship information.

The matching relationship information may include a matching rotation angle between the target registered fingerprint image and a reference registered fingerprint image included in the target registered fingerprint image group, and a matching rotation angle between the reference registered fingerprint image and the other registered fingerprint image.

The determining of the second similarity may include determining a matching rotation angle between the query fingerprint image and the target registered fingerprint image, arranging the query fingerprint image and the target registered fingerprint image based on the determined matching rotation angle, and determining a second similarity between the query fingerprint image and the target registered fingerprint image in a matching region in which the arranged query fingerprint image and the arranged target registered fingerprint image match each other.

The second similarity may be determined with a greater computational complexity than used to determine the first similarity.

The determining of whether the fingerprint verification is successful may include determining whether the fingerprint verification is successful based on a second similarity of a matching region between the query fingerprint image and at least one registered fingerprint image included in the target registered fingerprint image group.

In one general aspect, there is provided a fingerprint registration method including receiving a current fingerprint image for fingerprint registration, determining a similarity between the current fingerprint image and a previously registered fingerprint image, classifying the current fingerprint image and the registered fingerprint image into a registered fingerprint image group, in response to the similarity satisfying a condition, determining matching relationship information between the current fingerprint image and a reference registered fingerprint image in the registered fingerprint image group, and storing the determined matching relationship information.

The determining of the matching relationship information may include determining a matching rotation angle between the current fingerprint image and the reference registered fingerprint image.

The classifying may include classifying the current fingerprint image and the registered fingerprint image into the registered fingerprint image group, in response to the similarity being greater than a threshold value.

The fingerprint registration method may include generating a new registered fingerprint image group including the current fingerprint image, in response to the similarity not satisfying the condition, and determining the current fingerprint image to be a reference registered fingerprint image in the generated new registered fingerprint image group.

The matching relationship information may include a matching rotation angle between the current fingerprint image and the reference registered fingerprint image, and a group identifier of the registered fingerprint image group assigned to the current fingerprint image.

In one general aspect, there is provided a fingerprint verification apparatus including a processor configured to receive a query fingerprint image, determine a first similarity between the query fingerprint image and each of registered fingerprint images, select a target registered fingerprint image group from registered fingerprint image groups based on the first similarity, determine a second similarity between the query fingerprint image and each of registered fingerprint images in the target registered fingerprint image group based on matching relationship information between the registered fingerprint images in the target registered fingerprint image group, and determine whether fingerprint verification of the query fingerprint image is successful based on the second similarity.

The processor may be configured to select a target registered fingerprint image, which is a registered fingerprint image having a greatest first similarity among the registered fingerprint images, and to select a registered fingerprint image group including the target registered fingerprint image to be the target registered fingerprint image group.

The processor may be configured to determine a second similarity between the query fingerprint image and the target registered fingerprint image, and to determine a second similarity between the query fingerprint image and another registered fingerprint image included in the target registered fingerprint image group based on a matching rotation angle between the query fingerprint image and the target registered fingerprint image and the matching relationship information.

The matching relationship information may include information associated with a matching rotation angle between the registered fingerprint images in the target registered fingerprint image group, and the matching rotation angle is determined in a fingerprint registration process.

In one general aspect, there is provided a computing apparatus including a fingerprint sensor configured to obtain a current fingerprint image for fingerprint registration, and a processor configured to determine a similarity between the current fingerprint image and a previously registered fingerprint image, classify the current fingerprint image and the registered fingerprint image into a same registered fingerprint image group, in response to the determined similarity satisfying a condition, determine matching relationship information between the current fingerprint image and a reference registered fingerprint image in the registered fingerprint image group, and store the determined matching relationship information.

The matching relationship information may include a matching rotation angle between the current fingerprint image and the reference registered fingerprint image and a group identifier of the registered fingerprint image group assigned to the current fingerprint image.

Other features and aspects will be apparent from the following detailed description, the drawings, and the claims.

BRIEF DESCRIPTION OF THE DRAWINGS

FIG. 3 is a diagram illustrating an example of a fingerprint registration method.

Figure 1:
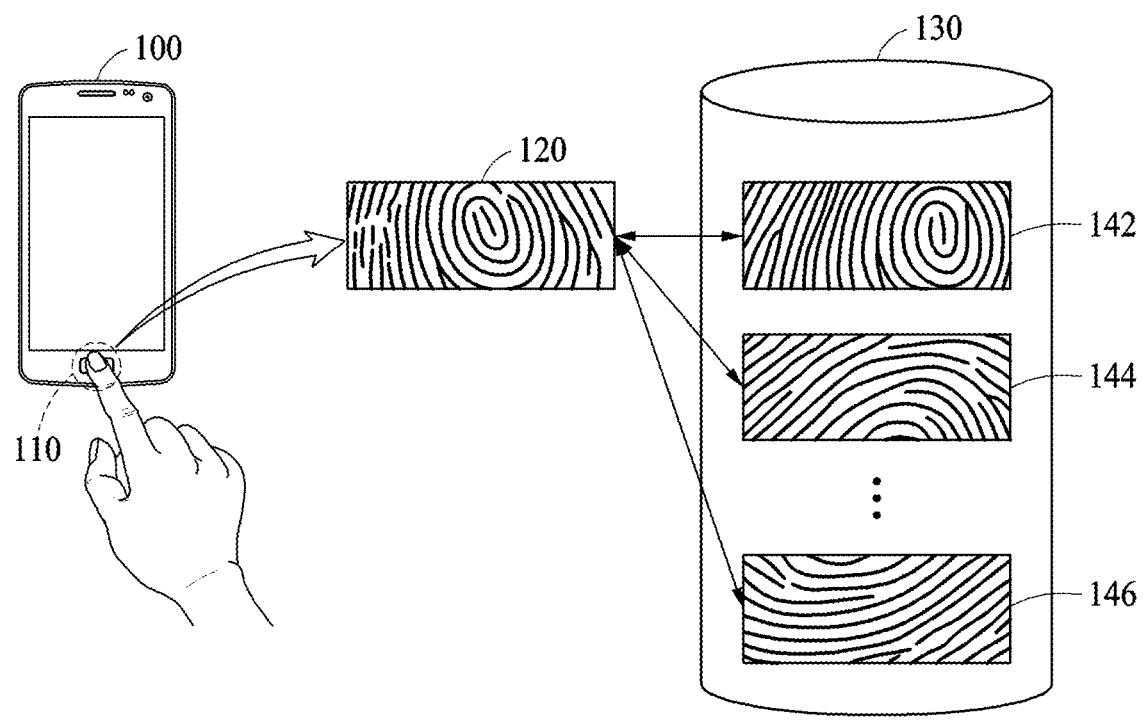
FIG. 1 is a diagram illustrating an example of a fingerprint verification method.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. For example, as used herein, the singular forms "a," "an," and "the," are intended to include the plural forms as well, unless the context clearly indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

FIG. 1 is a diagram illustrating an example of a fingerprint verification method.

Fingerprint verification refers to a verification method used to determine whether a user is a valid user or not, and verify a valid user in applications, such as, for example, user log-in, payment services, financial services, and access control. Referring to FIG. 1, a fingerprint verification apparatus that performs such a verification method is included in, or represented by, a computing apparatus 100.

In an example, the computing apparatus 100 includes various types of products such as, for example, an intelligent agent, a mobile phone, a cellular phone, a smart phone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a server, a personal computer (PC), a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device, portable navigation device (PND), a handheld game console, an e-book, a high definition television (HDTV), a smart appliance, a home appliance, a biometrics-based door lock, a security device, a financial service device, a kiosk, communication systems, image processing systems, graphics processing systems, various Internet of Things (IoT) devices that are controlled through a network, a smart vehicle, other consumer electronics/information technology (CE/IT) device, or any other device capable of wireless communication or network communication consistent with that disclosed herein.

The examples may be applied to image processing for user authentication using a smart phone, a mobile device, a smart home system, an intelligent vehicle, and an automated teller machine (ATM). Further, the examples may also be applied to an intelligent vehicle system that automatically starts by authenticating a user. The examples may also be applied to image processing for user authentication in an intelligent vehicle, an apparatus for automatic driving, a smart home environment, a smart building environment, a smart office environment, office automation, and a smart electronic secretary system.

In the example of the computing apparatus 100 illustrated in FIG. 1, the computing apparatus 100 is a smartphone. In an example, the computing apparatus 100 obtains a fingerprint image 120 through a fingerprint sensor 110, and determine whether a user attempting access the computing apparatus 100 is a valid user or not based on the obtained fingerprint image 120. For example, when the user inputs a fingerprint of the user to the fingerprint sensor 110 to cancel a lock state of the computing apparatus 100, the computing apparatus 100 compares the fingerprint image 120 obtained through the fingerprint sensor 110 to at least one of registered fingerprint images 142, 144, 146 stored in a database DB 130, and determines whether to cancel the lock state of the computing apparatus 100 based on a result of the comparing. A fingerprint image input for the fingerprint verification will be hereinafter referred to as a query fingerprint image.

In an example, a valid user registers fingerprint information of the valid user in the computing apparatus 100, in advance, in a fingerprint registration process. In the fingerprint registration process, the valid user may input, to the fingerprint sensor 110, a fingerprint the valid user desires to register in the computing apparatus 100, and the fingerprint sensor 110 may then obtain at least one fingerprint image. In an example, the obtained fingerprint image is registered as a registered fingerprint image. In an example, the registered fingerprint image is stored in the DB 130 or the computing apparatus 100 or at an external storage medium, such as, for example, cloud storage. The stored registered fingerprint image is used in a fingerprint verification process to match a query fingerprint image and determine whether a fingerprint pattern in the query fingerprint image corresponds to the valid user.

Figure 2A:
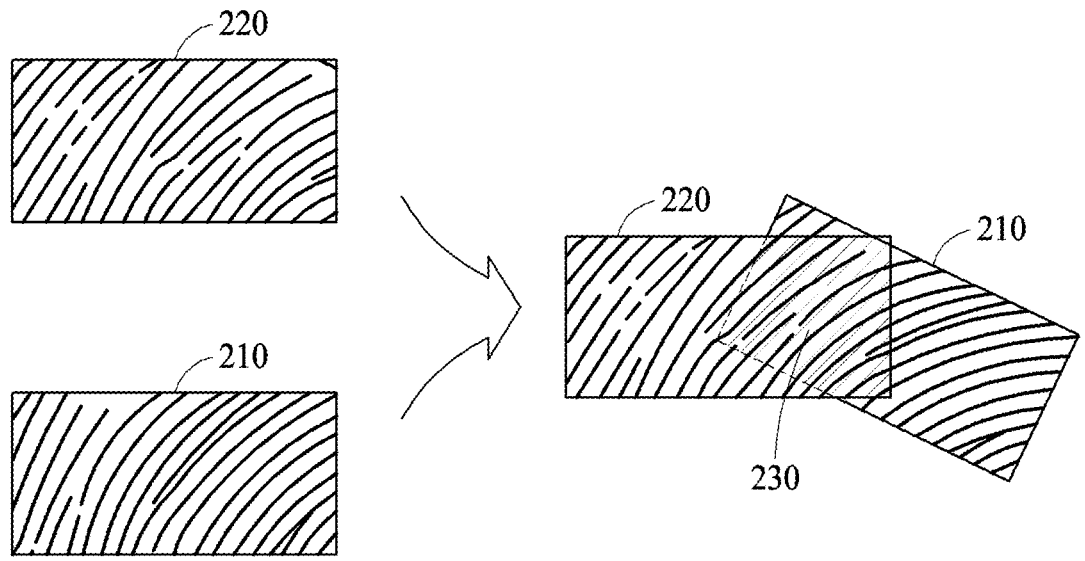
FIGS. 2A and 2B are diagrams illustrating examples of matching between a query fingerprint image and a registered fingerprint image.
Figure 2B:
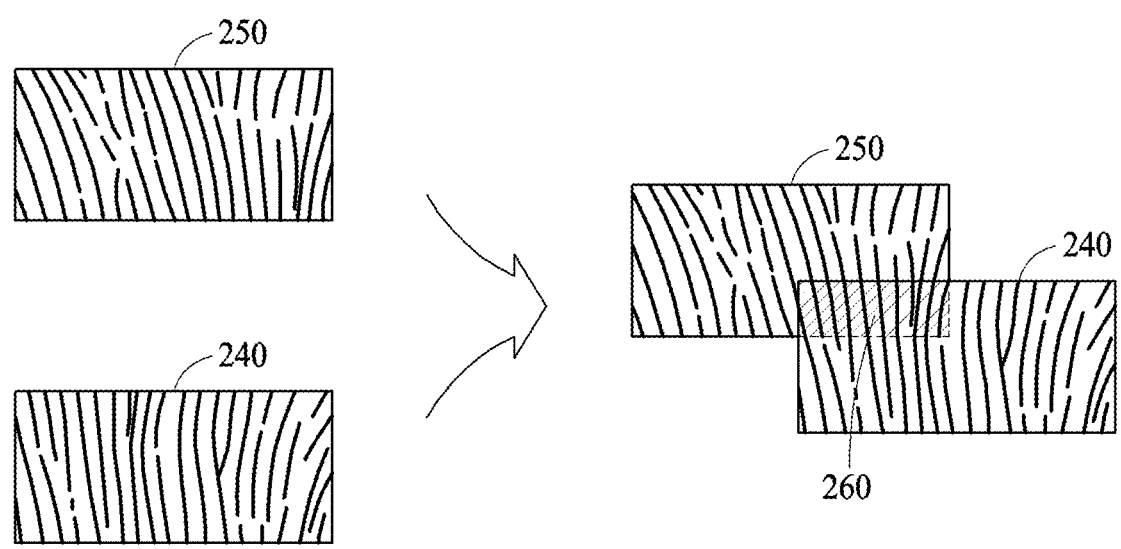

FIGS. 2A and 2B are diagrams illustrating examples of matching between a query fingerprint image and a registered fingerprint image.

Referring to FIG. 2A, in a fingerprint verification process, success or failure of fingerprint verification is determined based on a comparison of a query fingerprint image 210 and at least one registered fingerprint image, for example, a registered fingerprint image 220. To compare fingerprint patterns of the two fingerprint images, matching between the query fingerprint image 210 and the registered fingerprint image 220 is performed. In an example, the matching used herein refers to an operation to determine or discover a matching region 230 in which the query fingerprint image 210 and the registered fingerprint image 220 share a same or similar fingerprint pattern. In an example, the matching includes rotating and/or translating at least one of the query fingerprint image 210 or the registered fingerprint image 220.

A size of the query fingerprint image 210 and a size of the registered fingerprint image 220 are determined by a sensing region of a fingerprint sensor that is configured to sense a fingerprint image. As the fingerprint sensor has become smaller in size, a size of the sensing region of the fingerprint sensor has also decreased gradually. The size of the sensing region may restrict of the amount of information obtained by the fingerprint sensor and included in the query fingerprint image 210 and/or the registered fingerprint image 220 to only a portion of an entire fingerprint, or a partial fingerprint. Thus, as illustrated in FIG. 2B, a small-size matching region 260 between a query fingerprint image 240 and a registered fingerprint image 250 may be obtained. However, using such a small-size matching region 260 may result in incorrect matching between the query fingerprint image 240 and the registered fingerprint image 250. Thus, a small-size of the matching region 260 means that there may be insufficient information or clues for accurately matching between fingerprint images.

In a fingerprint registration process, a user may register a fingerprint multiple times for a same finger. The user may tend to attempt to register fingerprints in a similar pose, and thus, there is likelihood that a size of a matching region between registered fingerprint images of the finger is large. A method of precalculating matching relationship information associated between registered fingerprint images, pre-storing the calculated matching relationship information in the fingerprint registration process, and then matching a query fingerprint image and a registered fingerprint image based on corresponding matching relationship information in a fingerprint verification process will be described hereinafter. Thus, matching between the query fingerprint image and the registered fingerprint image may be performed more accurately, and fingerprint verification may be performed more rapidly. The method will be described hereinafter in greater detail with reference to the accompanying drawings.

FIG. 3 is a diagram illustrating an example of a fingerprint registration method. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. One or more blocks of FIG. 3, and combinations of the blocks, can be implemented by special purpose hardware-based computer that perform the specified functions, or combinations of special purpose hardware and computer instructions. In addition to the description of FIG. 3 below, the descriptions of FIGS. 1-2 are also applicable to FIG. 3, and are incorporated herein by reference. Thus, the above description may not be repeated here.

In a fingerprint registration process, a user may register a fingerprint for at least one finger of the user. For example, the user registers a fingerprint of an index finger multiple times, and a fingerprint image is captured each time the user registers a fingerprint and the captured fingerprint image is stored as a registered fingerprint image. In an example, registered fingerprint images may be stored without an additional operation, such as stitching, to form an entire fingerprint through image synthesis.

In operation 310, a computing apparatus receives a current fingerprint image for fingerprint registration. In an example, the current fingerprint image refers to a fingerprint image that is obtained through a fingerprint sensor. Although not illustrated, in an example, the computing apparatus preprocesses the received current fingerprint image. In an example, the image preprocessing is performed to, for example, improve a quality of the current fingerprint image and to adjust a size of the current fingerprint image so that the current fingerprint image is in a more suitable form for fingerprint registration. The image preprocessing includes, for example, removing noise included in the current fingerprint image, increasing a contrast of the current fingerprint image, deblurring the current fingerprint image, performing warping to correct a distortion in the current fingerprint image, binarizing the current fingerprint image, normalizing a size of the current fingerprint image, and cropping the current fingerprint image.

When the current fingerprint image is a first fingerprint image to be registered, i.e. when there is no other previously registered fingerprint image, the current fingerprint image may be registered without following operations 320 through 370. The computing apparatus may generate a new registered fingerprint image group including the current fingerprint image, and set the current fingerprint image to be a reference registered fingerprint image in the generated new registered fingerprint image group. In an example, the computing apparatus performs the fingerprint registration on a fingerprint image that is received subsequently in accordance with operations 320 through 370.

In operation 320, the computing apparatus determines a similarity between the current fingerprint image and a previously registered fingerprint image. In an example, the computing apparatus calculates the similarity between fingerprint patterns of the current fingerprint image and the registered fingerprint image in a matching region. In an example, the matching region refers to a region in which a fingerprint pattern of the current fingerprint image and a fingerprint pattern of the registered fingerprint image are same or similar to each other. A high similarity or a low similarity used herein indicates the level of relative similarities of fingerprint patterns of two fingerprint images. In an example, when there are plural registered fingerprint images, the computing apparatus may determine a similarity between the current fingerprint image and each of the registered fingerprint images.

In one example, the computing apparatus uses, as the similarity, a feature value obtained by performing a fast Fourier transform (FFT) on the current fingerprint image and the registered fingerprint image. In an example, the computing apparatus calculates the similarity through an image frequency information-based matching method such as a Fourier-Mellin transform. The similarity may be determined based on phase correlation information obtained using the Fourier-Mellin transform. In another example, the similarity may be determined based on rotation information and translation information associated with a rotation and a translation observed between the current fingerprint image and the registered fingerprint image in addition to the phase correlation information. Determination of similarity based on the Fourier-Mellin transform will be further described with reference to FIGS. 10 through 12. However, the determining of the similarity between the current fingerprint image and the registered fingerprint image is not limited to using the Fourier-Mellin transform, and various other methods may be used to determine a similarity between fingerprint patterns. For example, a similarity may be determined based on a distribution or form of feature points extracted from the fingerprint patterns.

In operation 330, the computing apparatus determines whether the determined similarity satisfies a condition. In one example, the computing apparatus determines whether the similarity is greater than a threshold value. The computing apparatus determines that the similarity satisfies the condition in response to the similarity being greater than the threshold value, and that the similarity does not satisfy the condition in response to the similarity not being greater than the threshold value.

In operation 350, when the similarity satisfies the condition, the computing apparatus classifies the current fingerprint image and the registered fingerprint image into a same registered fingerprint image group. Registered fingerprint images may be classified into registered fingerprint image groups based on their similarities, and thus, more than one registered fingerprint image groups may be generated as a result of the classifying. For example, when a similarity between the current fingerprint image and only one of the registered fingerprint images satisfies the condition, the current fingerprint image may be determined to be included in a registered fingerprint image group to which the one registered fingerprint image belongs. In another example, when similarities between the current fingerprint image and plural registered fingerprint images satisfy the condition, and the plural registered fingerprint images belong to different registered fingerprint image groups, the different registered fingerprint image groups may be merged into a single registered fingerprint image group and the current fingerprint image may be determined to be included in the single registered fingerprint image group. In an example, a group identifier of the registered fingerprint image group including the current fingerprint image may be assigned to the current fingerprint image.

In an example, each of the registered fingerprint image groups has a reference registered fingerprint image. The reference registered fingerprint image refers to a registered fingerprint image that is used as a reference for a registered fingerprint image group, which includes the reference registered fingerprint image. For example, a registered fingerprint image that is included first in each of the registered fingerprint image groups may be set to be the reference registered fingerprint image.

In operation 360, the computing apparatus determines matching relationship information associated with a matching relationship between the current fingerprint image and a reference registered fingerprint image included in the registered fingerprint image group obtained in operation 350. The matching relationship information includes, for example, information associated with a matching rotation angle between the current fingerprint image and the reference registered fingerprint image and the group identifier of the registered fingerprint image group assigned to the current fingerprint image. The matching rotation angle refers to an angle by which a fingerprint image needs to be rotated for matching. For example, the matching rotation angle may be an angle by which the current fingerprint image needs to be rotated relative to the reference registered fingerprint image for matching.

In operation 370, the computing apparatus stores the matching relationship information determined in operation 360. The computing apparatus updates previously stored matching relationship information of the registered fingerprint image group including the current fingerprint image based on the matching relationship information of the current fingerprint image. In an example, the updating is performed by adding the matching relationship information of the current fingerprint image to the previously stored matching relationship information.

In operation 340, when it is determined that the similarity does not satisfy the condition, the computing apparatus generates a new registered fingerprint image group including the current fingerprint image, and assigns a group identifier of the new registered fingerprint image group to the current fingerprint image. The computing apparatus determines the current fingerprint image to be a reference registered fingerprint image of the new registered fingerprint image group. A matching rotation angle of the current fingerprint image may be set to be a reference value, for example, 0 degrees (°), and matching relationship information including information associated with the matching rotation angle of the current fingerprint image and the group identifier assigned to the current fingerprint image may be stored.

As described above, in a fingerprint registration process, registered fingerprint images may be classified into registered fingerprint image groups based on similarities, and the registered fingerprint images may be stored along with matching relationship information associated with a matching relationship between registered fingerprint images classified into a same registered fingerprint image group. For example, matching relationship information associated with a matching relationship between a reference registered fingerprint image included in a registered fingerprint image group and another registered fingerprint image included in the registered fingerprint image group may be stored. The matching relationship information may include a group identifier assigned to the registered fingerprint images included in the registered fingerprint image group, and relative matching rotation angles between the registered fingerprint images included in the registered fingerprint image group. In an example, the matching relationship information may be represented in Table 1.

TABLE 1

| Identifier of registered fingerprint image | Group identifier of registered fingerprint image group | Relative matching rotation angle in registered fingerprint image group (unit: degree [°]) |
|---|---|---|
| 1 | A | 0.0 |
| 2 | B | 0.0 |
| 3 | A | −10.0 |
| ... | ... | ... |
| N | B | 15.0 |

For example, as illustrated in Table 1, the matching relationship information may include information associated with identifiers assigned to identify registered fingerprint images, for example, 1, 2, 3, . . . , N, group identifiers assigned to identify registered fingerprint image groups to which corresponding registered fingerprint images belong, for example, A and B, and relative matching rotation angles, for example, 0.0, −10.0, . . . , 15.0, between registered fingerprint images included in a same registered fingerprint image group. The matching relationship information may be used to match a query fingerprint image and a registered fingerprint image in a fingerprint verification process, and to determine a matching rotation angle between the query fingerprint image and the registered fingerprint image more rapidly and accurately. In a case of a small-size matching region between the query fingerprint image and the registered fingerprint image, there may be a high probability that the matching rotation angle is incorrectly determined when performing the matching. However, using the matching relationship information, a more accurate matching rotation angle is determined, and the matching relationship information reduces a computational complexity and an amount of resources that are needed for matching fingerprint images.

Figure 4:
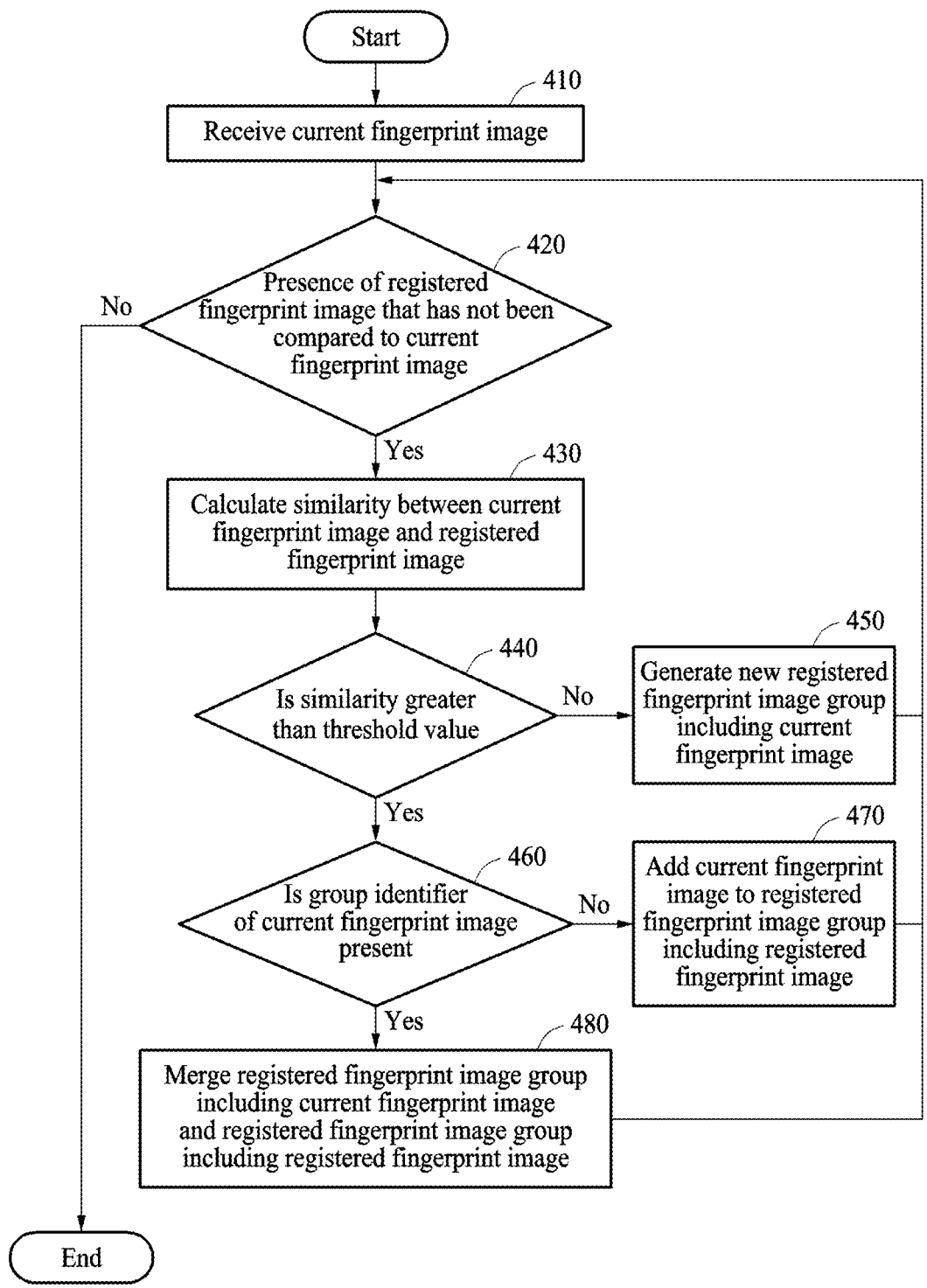
FIG. 4 is a diagram illustrating an example of a method of classifying registered fingerprint images into registered fingerprint image groups.

FIG. 4 is a diagram illustrating an example of a method of classifying registered fingerprint images into registered fingerprint image groups. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the descriptions of FIGS. 1-3 are also applicable to FIG. 4, and are incorporated herein by reference. Thus, the above description may not be repeated here for brevity.

Referring to FIG. 4, in operation 410, a computing apparatus receives a current fingerprint image that is input for fingerprint registration. In operation 420, the computing apparatus determines the presence of a registered fingerprint image that has not been compared to the current fingerprint image. When the registered fingerprint image is not present, a fingerprint registration process for the current fingerprint image is terminated.

In operation 430, when it is determined that the registered fingerprint image that has not been compared to the current fingerprint image is present, the computing apparatus calculates a similarity between the current fingerprint image and the registered fingerprint image. In operation 440, the computing apparatus determines whether the similarity is greater than a threshold value. In operation 450, when the similarity is not greater than the threshold value, the computing apparatus generates a new registered fingerprint image group including the current fingerprint image.

In operation 460, when the similarity is greater than the threshold value, the computing apparatus determines whether a group identifier of a registered fingerprint image group assigned to the current fingerprint image is present. When the current fingerprint image is to be initially compared to the registered fingerprint image, the group identifier is yet to be assigned to the current fingerprint image. When the current fingerprint image is previously compared to another registered fingerprint image, the group identifier assigned to the current fingerprint image is present.

In operation 470, when it is determined that the group identifier assigned to the current fingerprint image is not present, the computing apparatus adds the current fingerprint image to a registered fingerprint image group including the registered fingerprint image. The group identifier of the registered fingerprint image group may be assigned to the current fingerprint image.

In operation 480, when it is determined that the group identifier assigned to the current fingerprint image is present, the computing apparatus merges the registered fingerprint image group including the current fingerprint image and the registered fingerprint image group including the registered fingerprint image. Thus, the registered fingerprint image group including the current fingerprint image and the registered fingerprint image group including the registered fingerprint image may be set to be a same registered fingerprint image group, and a same group identifier may be assigned to the current fingerprint image and the registered fingerprint image. However, when the group identifier of the current fingerprint image and the group identifier of the registered fingerprint image are the same, i.e., when the registered fingerprint image group including the current fingerprint image and the registered fingerprint image group including the registered fingerprint image are the same, such merging may not be needed.

After any one of operations 450, 470, and 480 is completed, the operations described in the foregoing may be performed again on the current fingerprint image and another registered fingerprint image.

FIGS. 5A through 5D are diagrams illustrating an example of a method of classifying registered fingerprint images into registered fingerprint image groups. For convenience of description, fingerprint patterns of fingerprint images are omitted in FIGS. 5A through 5D, 6, and 9.

Figure 5A:
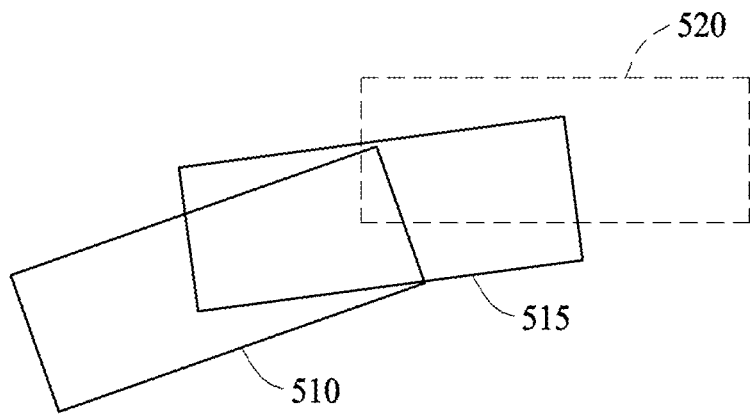
FIGS. 5A through 5D are diagrams illustrating an example of a method of classifying registered fingerprint images into registered fingerprint image groups.

FIG. 5A illustrates an example of a method of classifying a fingerprint image 520 into a registered fingerprint group. In this example, registered fingerprint images 510 and 515 are already included in a registered fingerprint image group A, and the fingerprint image 520 is newly input for fingerprint registration. When a similarity between the fingerprint image 520 and the registered fingerprint image 515 is greater than a threshold value, the fingerprint image 520 is classified into the registered fingerprint image group A and assigned with a group identifier of the registered fingerprint image group A.

Figure 5B:
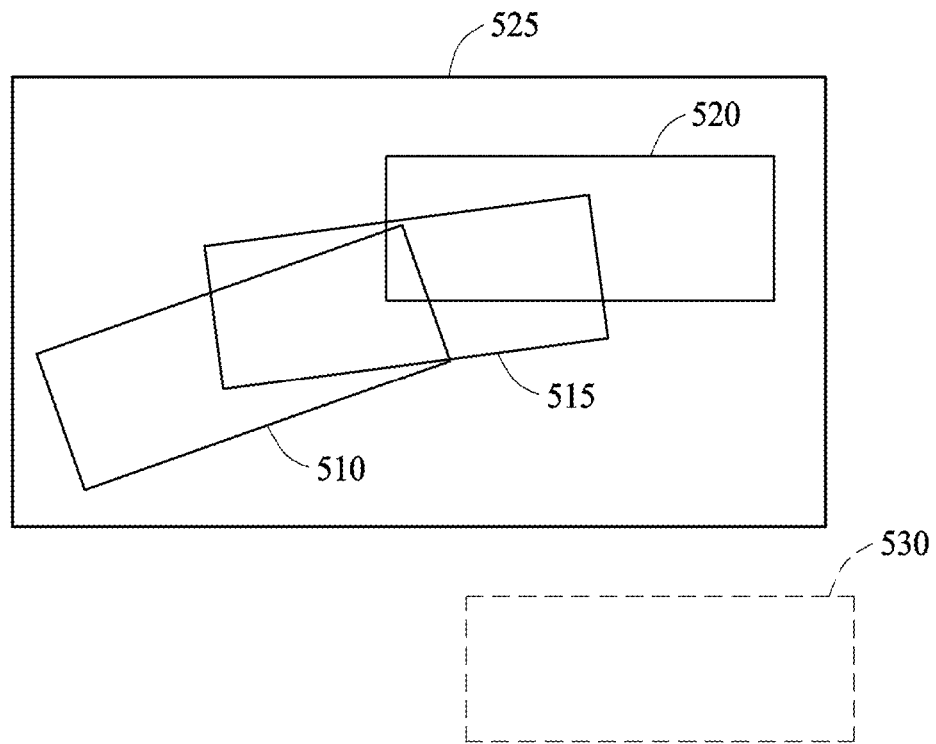

FIG. 5B illustrates an example of a method of classifying a new fingerprint image 530 into a registered fingerprint image group after the classifying of the fingerprint image 520 is completed. Referring to FIG. 5B, the registered fingerprint images 510, 515, and 520 are classified into a same registered fingerprint image group A 525. When a similarity between the fingerprint image 530 and each of the registered fingerprint images 510, 515, and 520 is not greater than the threshold value, a new registered fingerprint image group B is generated for the fingerprint image 530 and a group identifier of the registered fingerprint image group B is assigned to the fingerprint image 530.

Figure 5C:
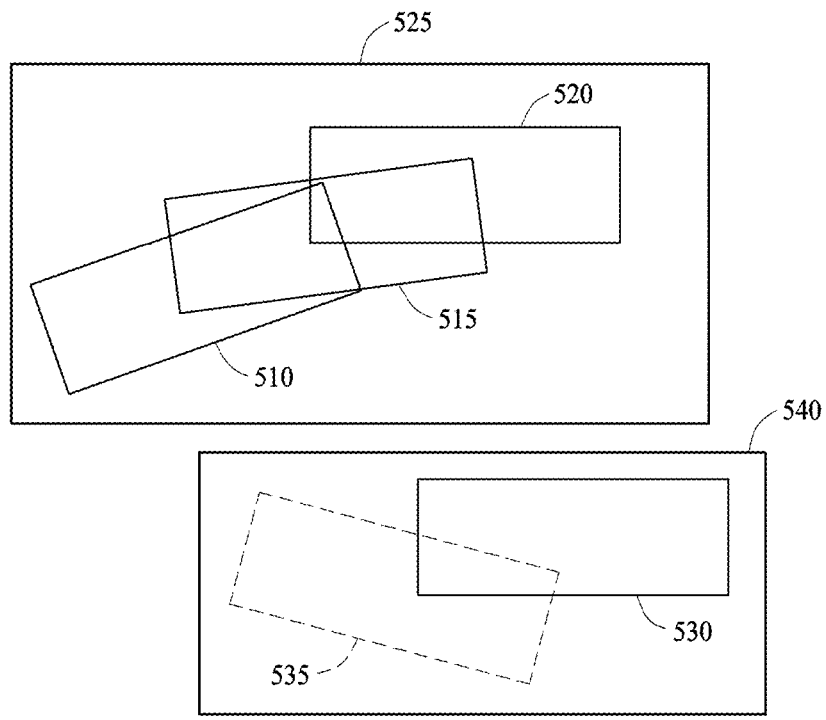

FIG. 5C illustrates an example of a method of classifying a new fingerprint image 535 into a registered fingerprint image group after the classifying of the fingerprint image 530 is completed. Referring to FIG. 5C, the registered fingerprint image group A 525 and a registered fingerprint image group B 540 are present. When a similarity between the fingerprint image 535 and the registered fingerprint image 530 is greater than the threshold value, the fingerprint image 535 is classified into the registered fingerprint image group B 540 and assigned with a group identifier of the registered fingerprint image group B 540.

Figure 5D:
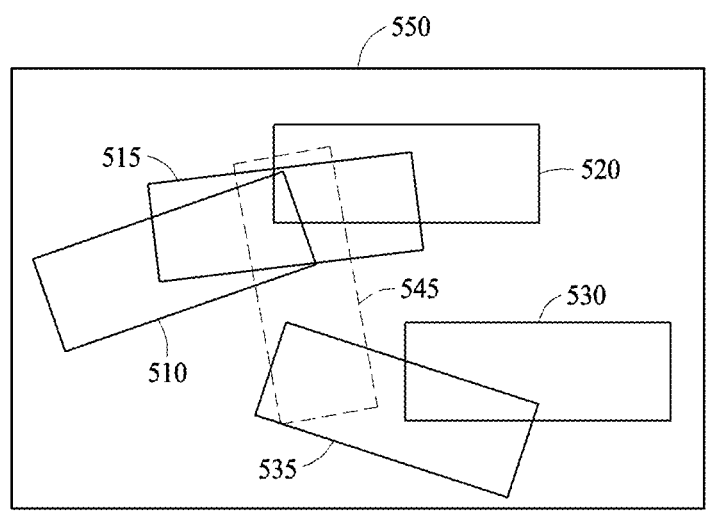

FIG. 5D illustrates an example of a method of classifying a new fingerprint image 545 into a registered fingerprint image group after the classifying of the fingerprint image 535 is completed. In this example, when a similarity between the fingerprint image 545 and each of the registered fingerprint images 515 and 535 is greater than the threshold value, corresponding registered fingerprint image groups are merged. Thus, registered fingerprint image groups A and B are merged into a single registered fingerprint image group 550.

Figure 6:
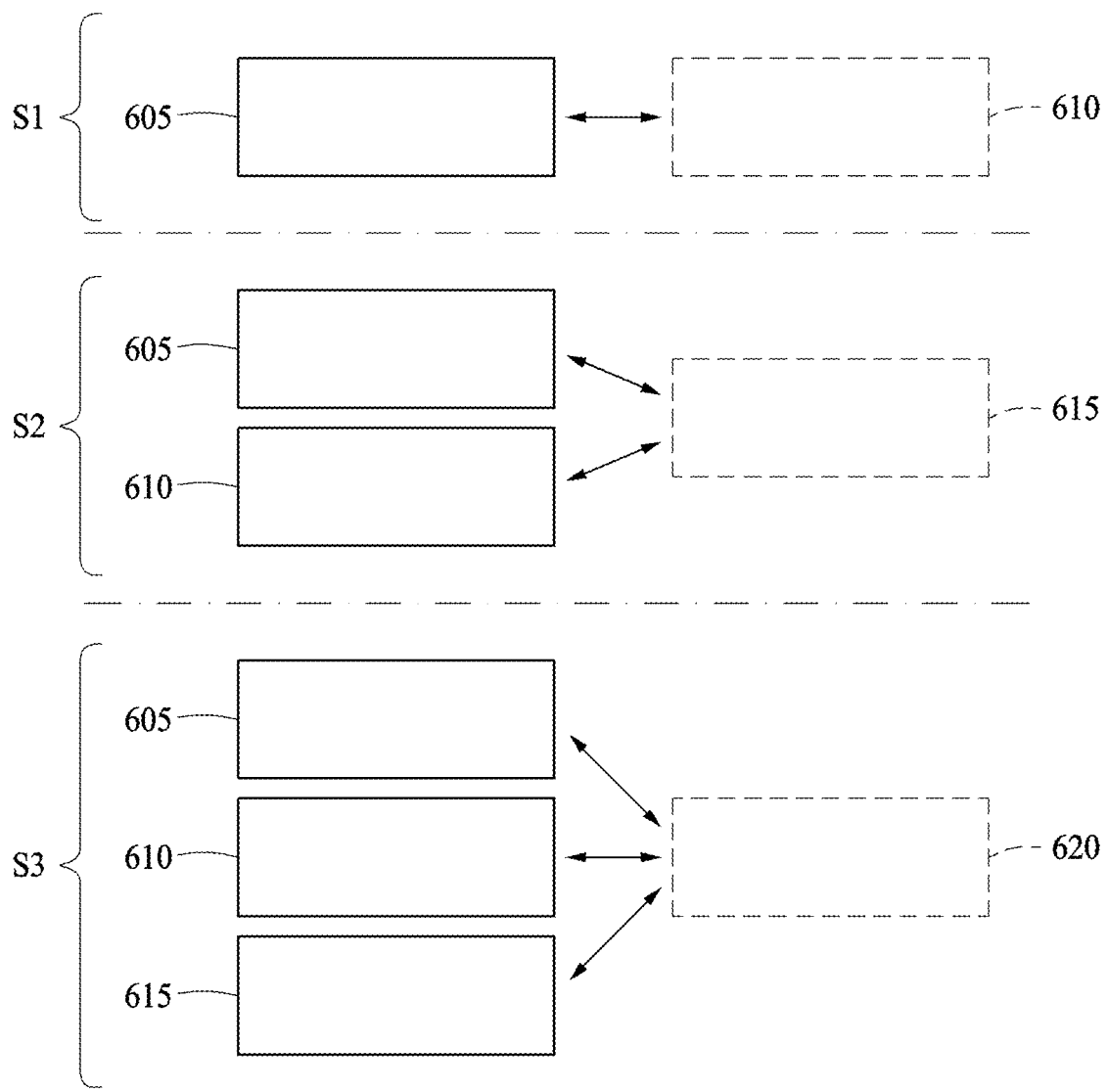
FIG. 6 is a diagram illustrating an example of a method of determining matching relationship information associated with a matching relationship between registered fingerprint images.

FIG. 6 is a diagram illustrating an example of a method of determining matching relationship information associated with a matching relationship between registered fingerprint images.

In this example, a registered fingerprint image 605 is included in a registered fingerprint image group A. In stage S1, a similarity and a matching rotation angle between a fingerprint image 610 that is input for fingerprint registration and the registered fingerprint image 605 included in the registered fingerprint image group A are determined as illustrated in Table 2.

TABLE 2

| | Similarity | Matching rotation angle (unit: degree [°]) |
|---|---|---|
| Registered fingerprint image 605 ⇔ fingerprint image 610 | 0.80 | 42.1 |

In this example, when a threshold value is 0.95, the similarity between the fingerprint image 610 and the registered fingerprint image 605 is not greater than the threshold value, and thus, a new registered fingerprint image group B including the fingerprint image 610 is generated. Here, corresponding matching relationship information is illustrated in Table 3. The registered fingerprint image 605 and the fingerprint image 610 are set to be a reference registered fingerprint image of the registered fingerprint image group A and a reference registered fingerprint image of the registered fingerprint image group B, respectively.

TABLE 3

| Identifier of registered fingerprint image | Group identifier of registered fingerprint image group | Relative matching rotation angle in registered fingerprint image group (unit: degree [°]) |
| --- | --- | --- |
| Registered fingerprint image 605: 1 | A | 0.0 |
| Registered fingerprint image 610: 2 | B | 0.0 |

In stage S2, a fingerprint image 615 is input for fingerprint registration, and a similarity and a matching rotation angle between the fingerprint image 615 and each of the registered fingerprint images 605 and 610 are determined as illustrated in Table 4.

TABLE 4

| | Similarity | Matching rotation angle (unit: degree [°]) |
| --- | --- | --- |
| Registered fingerprint image 605 ⇔ fingerprint image 615 | 0.97 | 5.3 |
| Registered fingerprint image 610 ⇔ fingerprint image 615 | 0.71 | 304.2 |

A similarity between the fingerprint image 615 and the registered fingerprint image 605 is greater than the threshold value, for example, 0.95, and a similarity between the fingerprint image 615 and the registered fingerprint image 610 is not greater than the threshold value, and thus the fingerprint image 615 is classified into the registered fingerprint image group A to which the registered fingerprint image 605 belongs. Here, corresponding matching relationship information is illustrated in Table 5.

TABLE 5

| Identifier of registered fingerprint image | Group identifier of registered fingerprint image group | Relative matching rotation angle in registered fingerprint image group (unit: degree [°]) |
| --- | --- | --- |
| Registered fingerprint image 605: 1 | A | 0.0 |
| Registered fingerprint image 610: 2 | B | 0.0 |
| Registered fingerprint image 615: 3 | A | 5.3 |

In stage S3, a fingerprint image 620 is input for fingerprint registration, and a similarity and a matching rotation angle between the fingerprint image 620 and each of the registered fingerprint images 605, 610, and 615 are determined as illustrated in Table 6.

TABLE 6

| | Similarity | Matching rotation angle (unit: degree [°]) |
| --- | --- | --- |
| Registered fingerprint image 605 ⇔ fingerprint image 620 | 0.96 | 10.6 |
| Registered fingerprint image 610 ⇔ fingerprint image 620 | 0.74 | 191.3 |
| Registered fingerprint image 615 ⇔ fingerprint image 620 | 0.81 | 180.0 |

A similarity between the fingerprint image 620 and the registered fingerprint image 605 is greater than the threshold value, for example, 0.95, and a similarity between the fingerprint image 620 and each of the registered fingerprint images 610 and 615 is not greater than the threshold value, and thus the fingerprint image 620 is classified into the registered fingerprint image group A to which the registered fingerprint image 605 belongs. Here, corresponding matching relationship information is illustrated in Table 7.

TABLE 7

| Identifier of registered fingerprint image | Group identifier of registered fingerprint image group | Relative matching rotation angle in registered fingerprint image group (unit: degree [°]) |
| --- | --- | --- |
| Registered fingerprint image 605: 1 | A | 0.0 |
| Registered fingerprint image 610: 2 | B | 0.0 |
| Registered fingerprint image 615: 3 | A | 5.3 |
| Registered fingerprint image 620: 4 | A | 10.6 |

According to another example, after classifying is performed on all fingerprint images to be registered, a relative matching rotation angle between registered fingerprint images included in a same registered fingerprint image group may be determined for each registered fingerprint image group.

Figure 7:
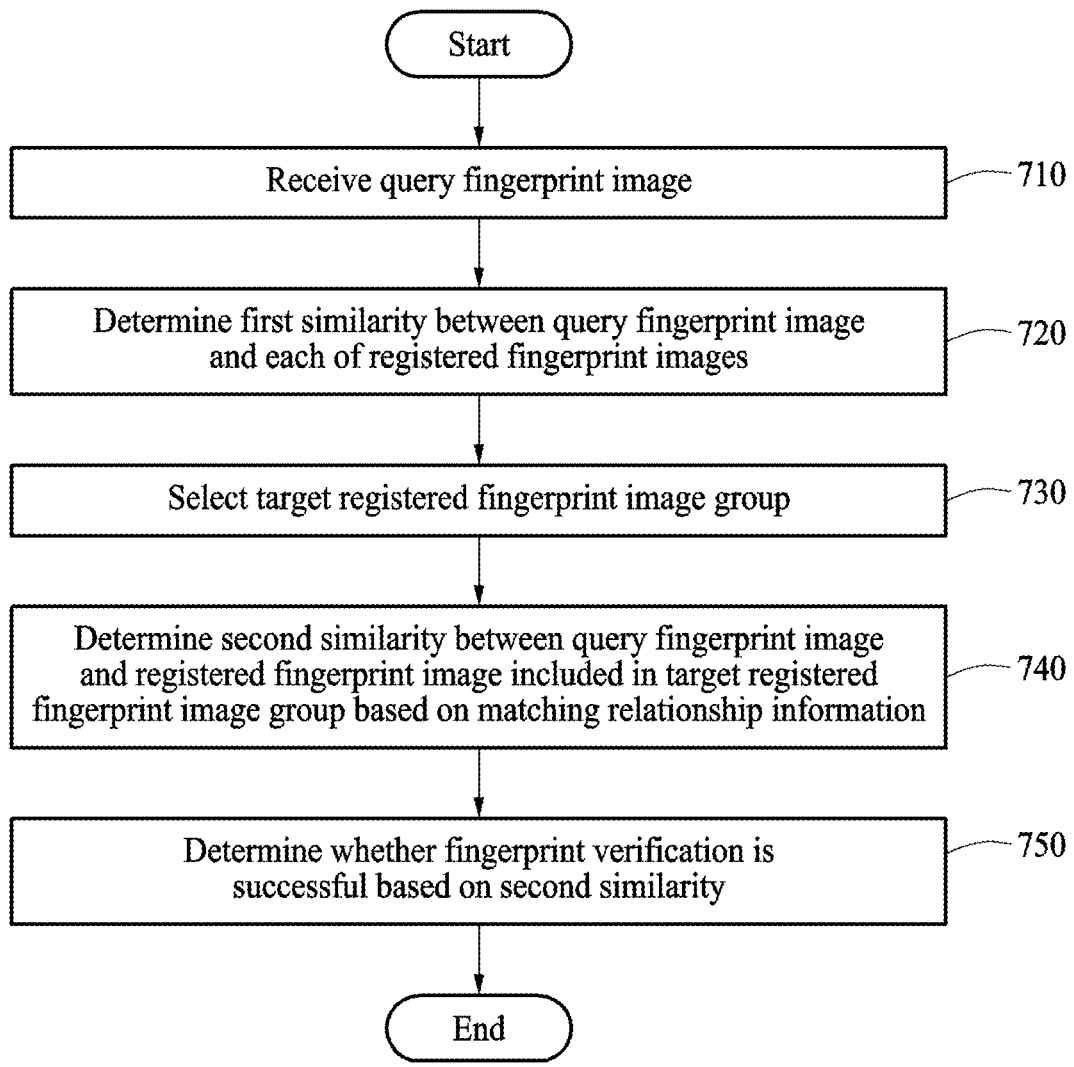
FIG. 7 is a diagram illustrating an example of a fingerprint verification method.

FIG. 7 is a flowchart illustrating an example of a fingerprint verification method. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 are also applicable to FIG. 7, and are incorporated herein by reference. Thus, the above description may not be repeated here.

Referring to FIG. 7, in operation 710, a fingerprint verification apparatus receives a query fingerprint image. The query fingerprint image refers to a fingerprint image, which is target for fingerprint verification, and may be obtained through a fingerprint sensor. Although not illustrated, the fingerprint verification apparatus may perform image pre-processing on the query fingerprint image, as described in operation 310 of FIG. 3.

In operation 720, the fingerprint verification apparatus determines a first similarity between the query fingerprint image and each of registered fingerprint images. In an example, the fingerprint verification apparatus uses, as the first similarity, a feature value obtained through an image frequency information-based matching method, such as, Fourier-Mellin transform. Additional detail on the determination of the first similarity based on the Fourier-Mellin transform is described with reference to FIGS. 10 through 12. A method of determining the first similarity between the query fingerprint image and a registered fingerprint image is not limited to the Fourier-Mellin transform, and various methods may be used to determine a similarity between fingerprint patterns without departing from the spirit and scope of the illustrative examples described.

In operation 730, the fingerprint verification apparatus selects a target registered fingerprint image group from registered fingerprint image groups based on the determined first similarity. The fingerprint verification apparatus selects a target registered fingerprint image, which is a registered fingerprint image having a greatest first similarity among the registered fingerprint images, and selects a registered fingerprint image group including the selected target registered fingerprint image to be the target registered fingerprint image group. As described above, fingerprint images registered in a fingerprint registration process may be classified into a plurality of registered fingerprint image groups, and the fingerprint verification apparatus may select a registered fingerprint image group from the registered fingerprint image groups based on the first similarity to perform fingerprint comparison more precisely and accurately.

In operation 740, the fingerprint verification apparatus determines a second similarity between the query fingerprint image and each of one or more registered fingerprint images included in the target registered fingerprint image group based on matching relationship information associated with a matching relationship between the registered fingerprint images included in the target registered fingerprint image group.

In one example, the fingerprint verification apparatus determines a matching rotation angle between the query fingerprint image and the target registered fingerprint image, and arranges the query fingerprint image and the target registered fingerprint image based on the determined matching rotation angle. In another example, the fingerprint verification apparatus arranges the query fingerprint image and the target registered fingerprint image using the matching rotation angle obtained in operation 720 of determining the first similarity. The fingerprint verification apparatus determines a second similarity between the query fingerprint image and the target registered fingerprint image in a matching region between the arranged query fingerprint image and the arranged target registered fingerprint image.

In an example, the fingerprint verification apparatus determines the second similarity between the query fingerprint image and the target registered fingerprint image using a method having a greater computational complexity than a method used to determine the first similarity. For example, phase correlation information obtained through the Fourier-Mellin transform is used to determine the first similarity in operation 720. Whereas, to determine the second similarity, rotation information and translation information between fingerprint images may be used, in addition to the phase correlation information. The determination of second similarity based on the Fourier-Mellin transform will be described in greater detail with reference to FIGS. 10 through 12.

The fingerprint verification apparatus determines a second similarity between the query fingerprint image and another registered fingerprint image included in the target registered fingerprint image group based on the matching rotation angle and the matching relationship information between the query fingerprint image and the target registered fingerprint image. The second similarity between the query fingerprint image and the another registered fingerprint image may also be determined using the method used to determine the second similarity between the query fingerprint image and the target registered fingerprint image.

The matching relationship information may include information associated with a matching rotation angle between the target registered fingerprint image and a reference registered fingerprint image included in the target registered fingerprint image group, and a matching rotation angle between the reference registered fingerprint image and another registered fingerprint image included in the target registered fingerprint image group. Based on relative matching rotation angles between registered fingerprint images, which are included in such matching relationship information, the matching rotation angle between the query fingerprint image and another registered fingerprint image included in the target registered fingerprint image group may be determined without an additional matching operation. For example, the matching rotation angle between the query fingerprint image and another registered fingerprint image included in the target registered fingerprint image group may be determined as represented by Equation 1.

$$\theta_a = \varphi - (\theta_c - \theta_b) \qquad \text{[Equation 1]}$$

In Equation 1, $\theta_a$ denotes a matching rotation angle between a query fingerprint image and one registered fingerprint image R included in a target registered fingerprint image group. $\varphi$ denotes a matching rotation angle between the query fingerprint image and a target registered fingerprint image, which refers to an angle by which the query fingerprint image is rotated relative to the target registered fingerprint image when the query fingerprint image matches the target registered fingerprint image. $\theta_b$ denotes a matching rotation angle between the target registered fingerprint image and a reference registered fingerprint image included in the target registered fingerprint image group, and $\theta_c$ denotes a matching rotation angle between the reference registered fingerprint image and the registered fingerprint image R. Here, since $\theta_b$ and $\theta_c$ are determined based on matching relationship information, a matching rotation angle between the query fingerprint image and each of registered fingerprint images included in the target registered fingerprint image group may be determined more rapidly and accurately when a value of $\varphi$ is determined.

In operation 750, the fingerprint verification apparatus determines whether fingerprint verification is successful based on the determined second similarity. In one example, the fingerprint verification apparatus determines whether fingerprint verification of the query fingerprint image is successful based on the second similarity for each matching region between the query fingerprint image and each of the one or more registered fingerprint images included in the target registered fingerprint image group. Additional details on the determination of success or failure of the fingerprint verification will be described with reference to FIG. 13.

In another example, the fingerprint verification apparatus selects a preset number of second similarities in descending order starting from a greatest second similarity, among respective second similarities of the registered fingerprint images included in the target registered fingerprint image group, and determines a score to be used to determine whether the fingerprint verification is successful based on the selected second similarities. For example, a mean value or a weighted sum of the selected second similarities may be determined to be the score. However, a method of determining the score is not limited to the example described in the foregoing, and the fingerprint verification apparatus may use various methods to determine the score. When the score is greater than a threshold value, the fingerprint verification apparatus determines that the fingerprint verification is successful. When the score is not greater than the threshold value, the fingerprint verification apparatus determines that the fingerprint verification is unsuccessful. In an example, although the score is greater than the threshold value, the fingerprint verification apparatus may determine that the fingerprint verification is unsuccessful when a size of a matching region between the query fingerprint image and each of the registered fingerprint images included in the target registered fingerprint image group is less than a threshold size.

When the fingerprint verification is determined to be successful, the fingerprint verification apparatus may cancel a lock state of a computing apparatus connected to the fingerprint verification apparatus, approve of user log-in, or authorize the use of a payment service or a financial service. When the fingerprint verification is determined to be unsuccessful, the fingerprint verification apparatus may maintain the lock state of the computing apparatus, or restrict the approval of the user log-in and the use of the payment service or the financial service.

Figure 8:
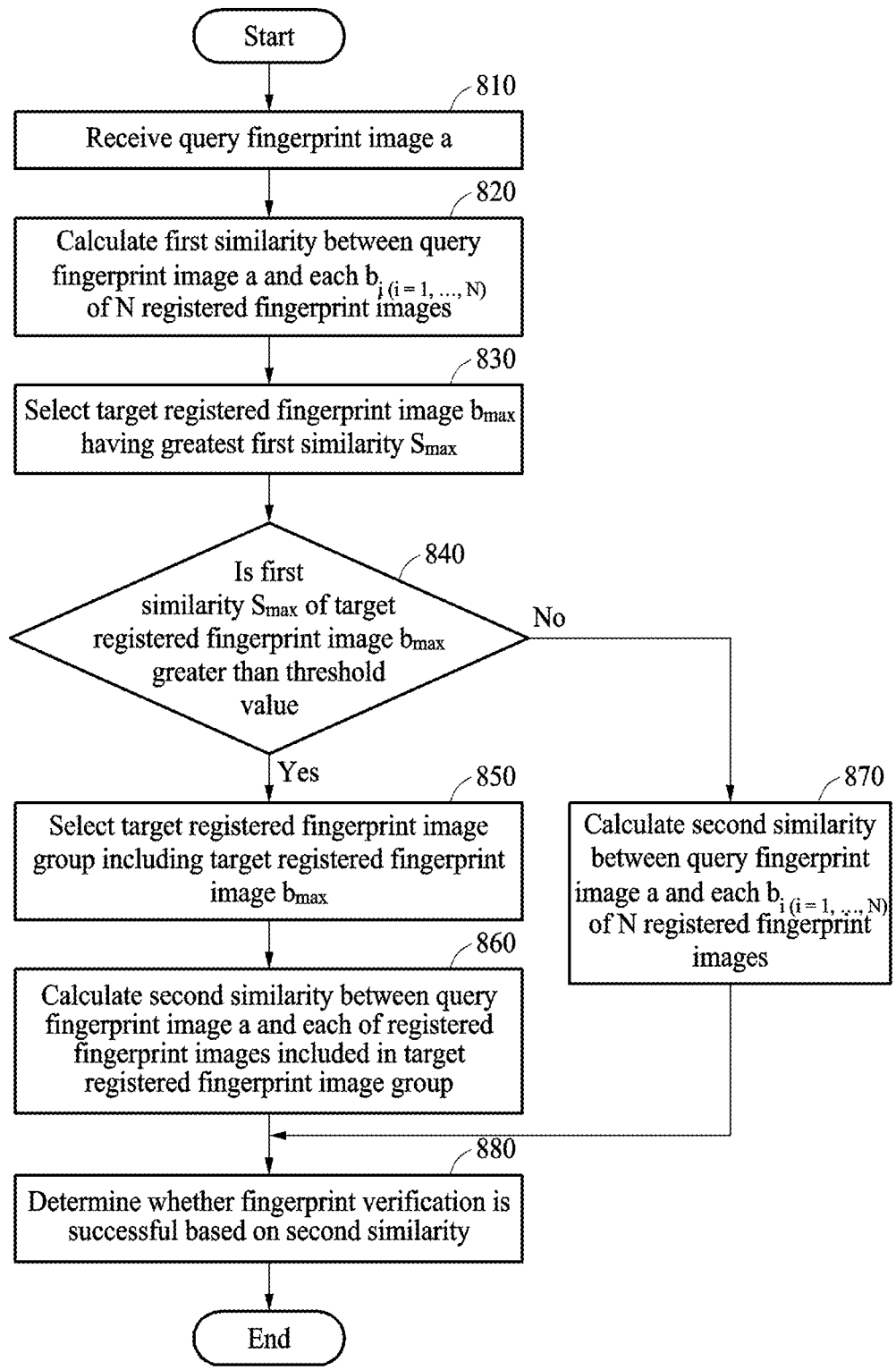
FIG. 8 is a diagram illustrating another example of a fingerprint verification method.

FIG. 8 is a diagram illustrating another example of a fingerprint verification method. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the descriptions of FIGS. 1-7 are also applicable to FIG. 8, and are incorporated herein by reference. Thus, the above description may not be repeated here for brevity.

Referring to FIG. 8, in operation 810, a fingerprint verification apparatus receives a query fingerprint image a. In operation 820, the fingerprint verification apparatus calculates a first similarity between the query fingerprint image a and each $b_i$ (where i=1, . . . , N) of N fingerprint images registered in a fingerprint registration process. Here, i denotes an index used to identify the registered fingerprint images. In operation 830, the fingerprint verification apparatus selects a target registered fingerprint image $b_{max}$, which is a registered fingerprint image having a greatest first similarity $S_{max}$ among the registered fingerprint images.

In operation 840, the fingerprint verification apparatus determines whether a first similarity $S_{max}$ of the target registered fingerprint image $b_{max}$ is greater than a threshold value. In operation 850, when the first similarity $S_{max}$ of the target registered fingerprint image $b_{max}$ is greater than the threshold value, the fingerprint verification apparatus selects, to be a target registered fingerprint image group, a registered fingerprint image group including the target registered fingerprint image $b_{max}$ from a plurality of registered fingerprint image groups.

In operation 860, the fingerprint verification apparatus calculates a second similarity between the query fingerprint image "a" and each of registered fingerprint images included in the target registered fingerprint image group. Thus, only second similarities of the registered fingerprint images included in the target registered fingerprint image group is calculated among all the registered fingerprint images. The fingerprint verification apparatus readily determines a matching rotation angle between the query fingerprint image a and each of the registered fingerprint images included in the target registered fingerprint image group using matching relationship information associated with a matching relationship between the registered fingerprint images included in the target registered fingerprint image group. The fingerprint verification apparatus matches the query fingerprint image a and a registered fingerprint image based on the determined matching rotation angle, and determines the second similarity in a matching region between the query fingerprint image a and the registered fingerprint image. In an example, the second similarity may be determined using a similarity calculation method with a greater accuracy, compared to a similarity calculation method used to determine the first similarity.

In operation 870, when the first similarity $S_{max}$ of the target registered fingerprint image $b_{max}$ not being greater than the threshold value, the fingerprint verification apparatus calculates a second similarity between the query fingerprint image a and each $b_i$ (i=1, . . . , N) of all the registered fingerprint images, which are not registered fingerprint images included in a certain registered fingerprint image group.

In operation 880, the fingerprint verification apparatus determines whether fingerprint verification is successful based on the second similarity calculated in operation 860 or 870. For example, the fingerprint verification apparatus determines a score based on second similarities of registered fingerprint images, and determines that the fingerprint verification is successful when the score being greater than a threshold value. When the score not being greater than the threshold value, the fingerprint verification apparatus determines that the fingerprint verification is unsuccessful.

Figure 9:
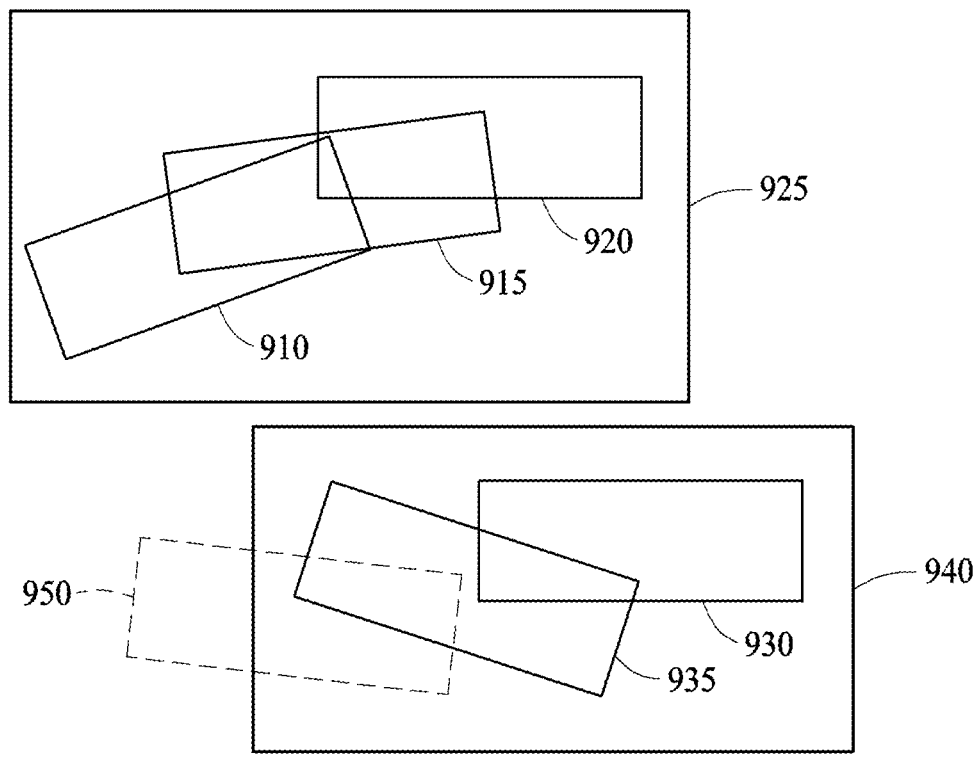
FIG. 9 is a diagram illustrating an example of a fingerprint verification method.

FIG. 9 is a diagram illustrating an example of a fingerprint verification method.

Referring to FIG. 9, fingerprint images registered in a fingerprint registration process are classified into a first registered fingerprint image group 925 including registered fingerprint images 910, 915, and 920, and a second registered fingerprint image group 940 including registered fingerprint images 930 and 935. When a query fingerprint image 950 is input in a fingerprint verification process, a fingerprint verification apparatus determines a first similarity between the query fingerprint image 950 and each of the registered fingerprint images 910, 915, 920, 930, and 935, regardless of whether the registered fingerprint images 910, 915, 920, 930, and 935 belong to the first registered fingerprint image group 925 or the second registered fingerprint image group 940.

In one example, when the first similarity between the query fingerprint image 950 and the registered fingerprint image 935 is determined to be greatest among the first similarities of the registered fingerprint images 910, 915, 920, 930, and 935, the fingerprint verification apparatus selects the registered fingerprint image 935 to be a target registered fingerprint image, and selects the second registered fingerprint image group 940 including the registered fingerprint image 935 to be a target registered fingerprint image group. The fingerprint verification apparatus determines a second similarity between the query fingerprint image 950 and each of the registered fingerprint images 930 and 935 included in the second registered fingerprint image group 940 based on matching relationship information associated with the registered fingerprint images 930 and 935. The fingerprint verification apparatus determines whether fingerprint verification is successful based on the determined second similarity.

In another example, when the first similarity of the registered fingerprint image 935, which is the greatest first similarity, is not greater than a threshold value, the fingerprint verification apparatus determines the second similarity between the query fingerprint image 950 and each of the registered fingerprint images 910, 915, 920, 930, and 935, and then determines whether the fingerprint verification is successful based on the determined second similarity.

Figure 10:
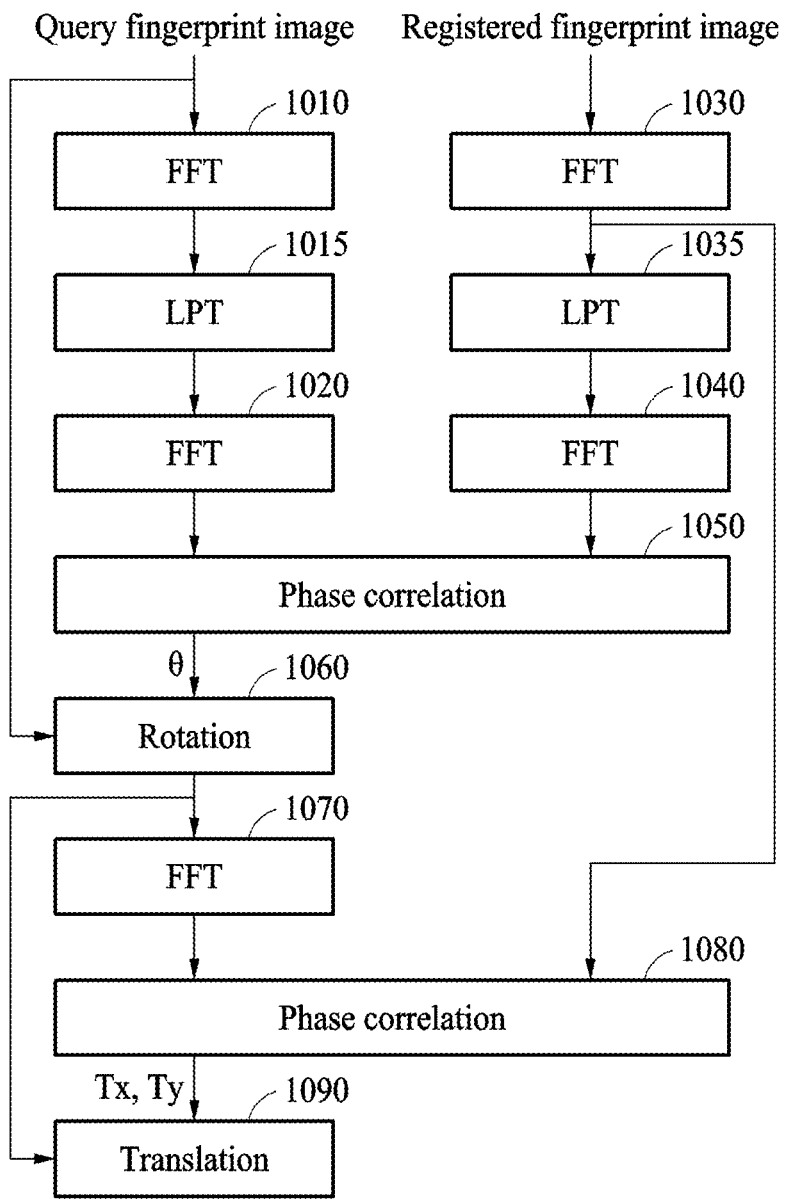
FIGS. 10 through 12 are diagrams illustrating examples of a method of determining a similarity between fingerprint images based on a Fourier-Mellin transform.
Figure 11:
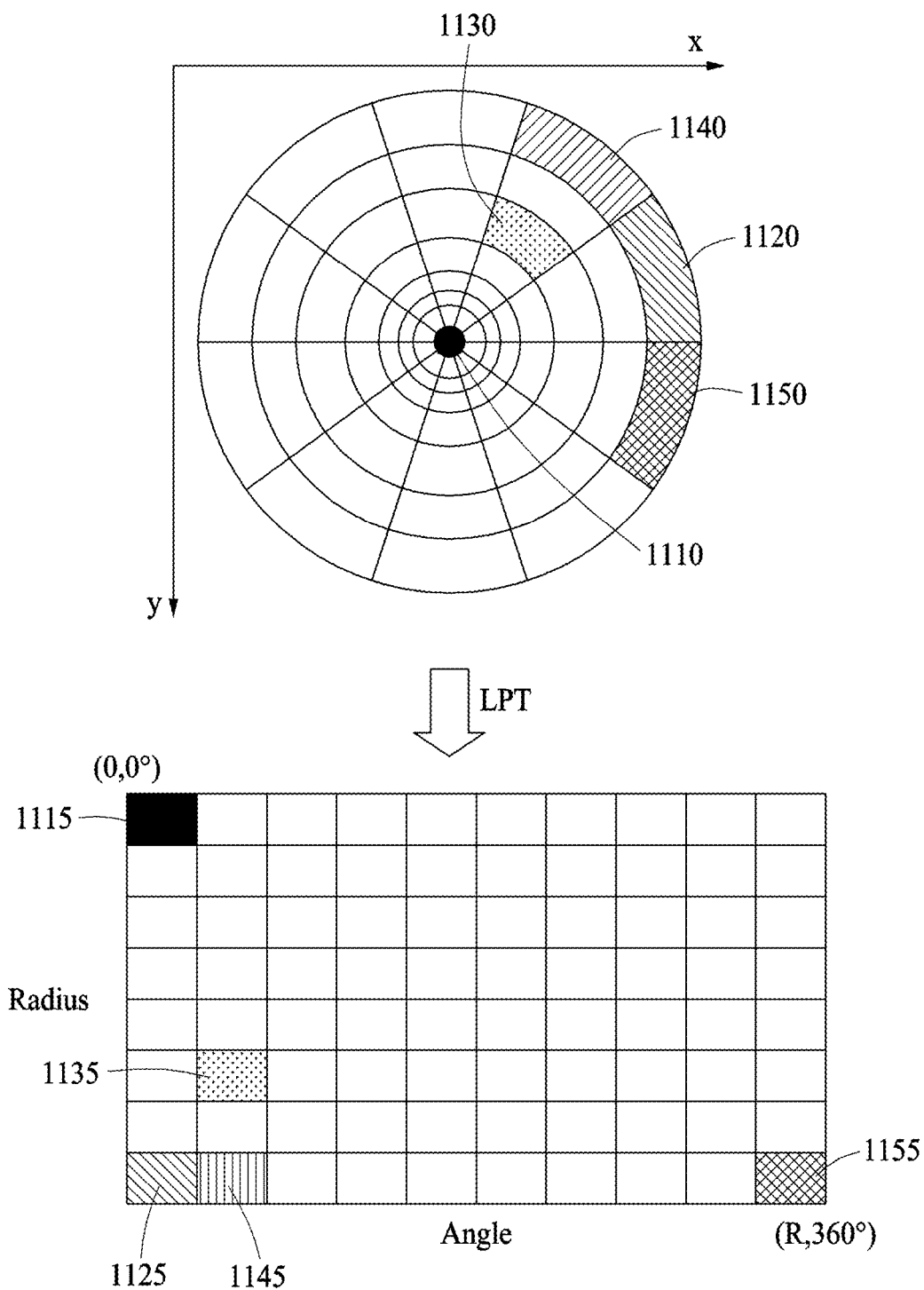
Figure 12:
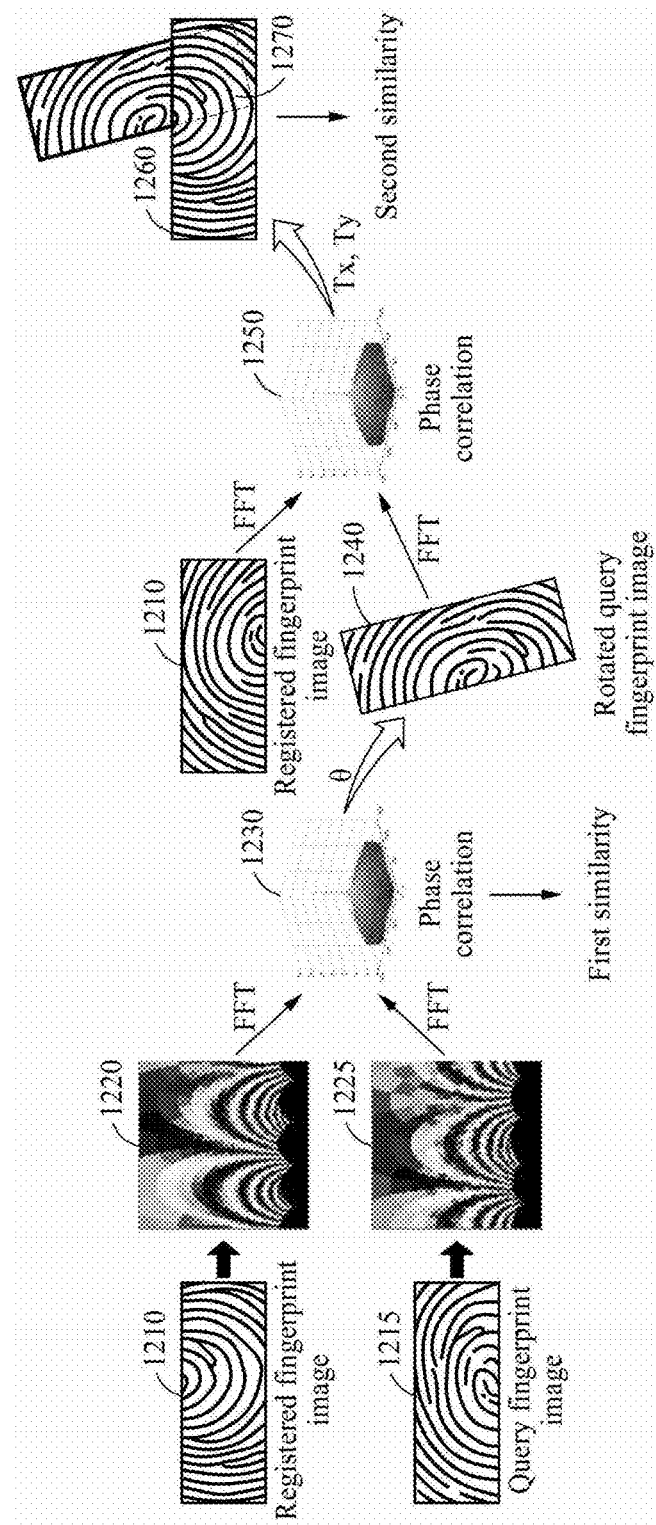

FIGS. 10 through 12 are diagrams illustrating examples of a method of determining a similarity between fingerprint images based on a Fourier-Mellin transform.

Referring to FIG. 10, in operation 1010, spatial domain information included in a query fingerprint image is transformed to frequency domain information through an FFT. In operation 1030, spatial domain information included in a registered fingerprint image is transformed to frequency domain information through an FFT. In an example, the frequency domain information is based on an orthogonal coordinate system that represents information using, for example, two-dimensional (2D) (x, y) coordinates.

In operation 1015, a coordinate system of the frequency domain information included in the query fingerprint image is transformed to a polar coordinate system through a log-polar transform (LPT). For example, the LPT may be performed on a magnitude value of each pixel in an FFT image obtained through the FFT. In the polar coordinate system, information may be represented by a radius, an angle, or a combination thereof. In operation 1035, an LPT is also applied to the frequency domain information included in the registered fingerprint image. Further details regarding LPT are provided with reference to FIG. 11.

FIG. 11 is a diagram illustrating an example of an LPT. Referring to FIG. 11, concentric circles are set based on a central point 1110 in an orthogonal coordinate system. The concentric circles may be divided into a plurality of regions based on a radius, an angle, or a combination thereof. For example, an LPT may map the regions (radius, angle) in the orthogonal coordinate system to regions in a polar coordinate system. In such an example, the central point 1110 in the orthogonal coordinate system is mapped to a region 1115 corresponding to (0, 0°) in the polar coordinate system. Similarly, a first region 1120, a second region 1130, a third region 1140, and a fourth region 1150 in the orthogonal coordinate system are mapped to a first region 1125, a second region 1135, a third region 1145, and a fourth region 1155, respectively, in the polar coordinate system.

Although not illustrated, the LPT may map regions in the orthogonal coordinate system to regions that are represented based on an angle in the polar coordinate system. In such a case, the first region 1120 in the orthogonal coordinate system is mapped to a (0°) region in the polar coordinate system, the second region 1130 and the third region 1140 in the orthogonal coordinate system are mapped to a (36°) region in the polar coordinate system, and the fourth region 1150 in the orthogonal coordinate system is mapped to a (324°) region in the polar coordinate system.

Referring back to FIG. 10, in operation 1020, an FFT is applied to the query fingerprint image obtained by applying the LPT. In operation 1040, an FFT is applied to the registered fingerprint image obtained by applying the LPT. In operation 1050, a phase correlation is performed based on a result of the FFT, and a feature of a peak is detected as a result of performing the phase correlation. For example, a location of the detected peak is represented by rotation information θ for matching between the query fingerprint image and the registered fingerprint image.

For another example, the location of the detected peak may indicate scale information between the query fingerprint image and a partial fingerprint image. For example, one axis of an image obtained through the LPT may correspond to an angle, and the other axis may correspond to a radius. The location of the peak detected by the phase correlation may be represented by (a coordinate of an axis corresponding to an angle, a coordinate of an axis corresponding to a radius). The coordinate of the axis corresponding to an angle may indicate matching rotation information, and the coordinate of the axis corresponding to a radius may indicate scale information.

A fingerprint image does not change in terms of scale, and thus, a radius may be fixed as a preset value, for example, 1. In such a case, the location of the peak detected by the phase correlation may be represented by the coordinate of the axis corresponding to the angle, and the coordinate of the axis corresponding to the angle may indicate rotation information.

In one example, a peak value may be detected through a phase correlation described herein, and the peak value may be used to determine a first similarity between the query fingerprint image and the registered fingerprint image. When a size of a region, or a matching region, in which fingerprint patterns of the query fingerprint image and the registered fingerprint image are similar or same, increases, or the fingerprint patterns of the query fingerprint image and the registered fingerprint image are more similar to each other, the peak value may tend to increase. Based on such a tendency, the first similarity between the query fingerprint image and the registered fingerprint image is determined based on the peak value detected through the phase correlation.

In operation 1060, the query fingerprint image is rotated based on rotation information θ. In operation 1070, an FFT is applied to the rotated query fingerprint image. In operation 1080, a phase correlation is performed based on the query fingerprint image to which the FFT is applied in operation 1070 and the registered fingerprint image to which the FFT is applied in operation 1030. A feature of a peak is detected as a result of the phase correlation, and a location of the detected peak indicates translation information (Tx, Ty) between the query fingerprint image and the registered fingerprint image. In operation 1090, the query fingerprint image rotated in operation 1060 is translated based on the translation information (Tx, Ty).

The query fingerprint image and the registered fingerprint image may be matched by rotating and translating the query fingerprint image based on rotation information and translation information that are obtained through the Fourier-Mellin transform described above. In an example, the second similarity is determined based on a matching region between the rotated and translated query fingerprint image and the registered fingerprint image. In one example, the second similarity is determined using a normalized cross correlation (NCC) method based on an image brightness value. For example, the second similarity is determined based on a correlation obtained through Equation 2.

$$ncc(I_1, I_2) = \frac{\sum_{(i,j)\in W} I_1(i,j) \cdot I_2(x+i, y+j)}{\sqrt[2]{\sum_{(i,j)\in W} I_1^2(i,j) \cdot \sum_{(i,j)\in W} I_2^2(x+i, y+j)}} \qquad \text{[Equation 2]}$$

In Equation 2, W denotes a matching region between a rotated and translated query fingerprint image $I_1$ and a registered fingerprint image $I_2$, and $ncc(I_1, I_2)$ denotes a correlation in the matching region W between the query fingerprint image $I_1$ and the registered fingerprint image $I_2$. i denotes an x-axis coordinate of a pixel in the matching region W, and j denotes a y-axis coordinate of the pixel in the matching region W. x denotes translation information (Tx) in an x-axis direction, and y denotes translation information (Ty) in a y-axis direction. $I_1(i, j)$ denotes a pixel value on (i, j) coordinates of the query fingerprint image $I_1$, and $I_2(x+i, y+j)$ denotes a pixel value on (x+i, y+j) coordinates of the registered fingerprint image $I_2$. The correlation in the matching region W, which is calculated through Equation 2, may be used as the second similarity between the query fingerprint image and the registered fingerprint image.

Although the example of the rotating and translating of the query fingerprint image is described with reference to FIG. 10, in an example, the registered fingerprint image may be rotated and translated, in lieu of the query fingerprint image, based on a result of a phase correlation. In an example, both the query fingerprint image and the registered fingerprint image may be rotated and translated for matching.

After the target fingerprint image group is determined in the fingerprint verification process, operations 1010 through 1050 of re-calculating the rotation information θ may not be needed. Instead, the rotation information θ for matching between the query fingerprint image and the registered fingerprint image may be determined based on matching relationship information associated with the registered fingerprint images. The rotation information θ may correspond to the matching rotation angle $θ_a$ in Equation 1 above.

Also, in the fingerprint registration process, a similarity between a current fingerprint image input for fingerprint registration and a registered fingerprint image may be determined using a method of determining the first similarity or the second similarity described above. Here, the query fingerprint image and the registered fingerprint image may be replaced with the current fingerprint image and the previously registered fingerprint image, respectively.

FIG. 12 is a diagram illustrating an example of a method of determining a similarity between a query fingerprint image and a registered fingerprint image based on a Fourier-Mellin transform.

Referring to FIG. 12, a registered fingerprint image 1210 is transformed to a first LPT image 1220 through an FFT and an LPT, and a query fingerprint image 1215 is transformed to a second LPT image 1225 through an FFT and an LPT. Through a phase correlation 1230 between the first LPT image 1220 and the second LPT image 1225, rotation information θ between the registered fingerprint image 1210 and query fingerprint image 1215 is determined. Based on a peak value detected through the phase correlation 1230, a first similarity between the registered fingerprint image 1210 and the query fingerprint image 1215 is determined.

The query fingerprint image 1215 is rotated based on the rotation information θ determined by the phase correlation 1230. In addition, translation information (Tx, Ty) between the registered fingerprint image 1210 and the query fingerprint image 1215 is determined by a phase correlation 1250 between an FFT image obtained by performing an FFT on the registered fingerprint image 1210 and an FFT image obtained by performing an FFT on a rotated query fingerprint image 1240 obtained by rotating the query fingerprint image 1215 based on the rotation information θ.

Based on the rotation information θ and the translation information (Tx, Ty), the registered fingerprint image 1210 and the query fingerprint image 1215 are matched, and a matching region 1270 between the registered fingerprint image 1210 and the query fingerprint image 1215 is determined. In one example, a correlation is calculated with respect to the matching region 1270 between the registered fingerprint image 1210 and the query fingerprint image 1215 in a matched image 1260 based on Equation 2 above, and the calculated correlation is determined to be a second similarity between the registered fingerprint image 1210 and the query fingerprint image 1215.

Figure 13:
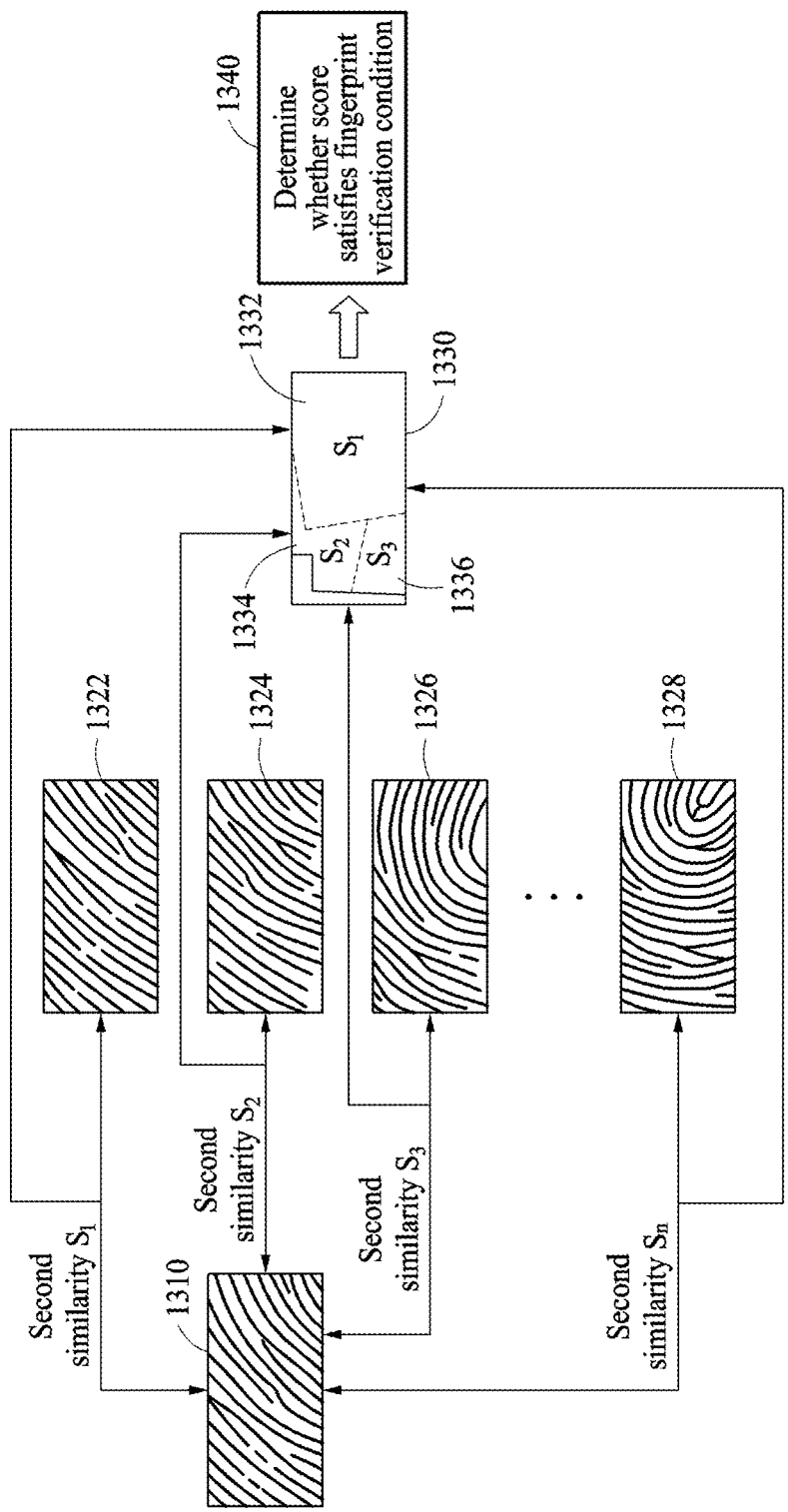
FIG. 13 is a diagram illustrating an example of a method of determining whether fingerprint verification is successful based on a matching region-based similarity.

FIG. 13 is a diagram illustrating an example of a method of determining whether fingerprint verification is successful based on a matching region-based similarity.

Referring to FIG. 13, when a target registered fingerprint image group is selected, a fingerprint verification apparatus determines whether fingerprint verification is successful based on a second similarity between a query fingerprint image 1310 and each of registered fingerprint images 1322, 1324, 1326, and 1328 included in the target registered fingerprint image group. In an example, the fingerprint verification apparatus performs the fingerprint verification based further on a matching region between the query fingerprint image 1310 and each of the registered fingerprint images 1322, 1324, 1326, and 1328, in addition to the second similarity between the query fingerprint image 1310 and each of the registered fingerprint images 1322, 1324, 1326, and 1328. The fingerprint verification apparatus determines a matching region-based similarity corresponding to the query fingerprint image 1310. The matching region-based similarity is represented by a second similarity between the query fingerprint image 1310 and each of the registered fingerprint images 1322, 1324, 1326, and 1328, allocated to a corresponding region of the query fingerprint image 1310. In one example, the fingerprint verification apparatus determines a matching region and a second similarity each time the fingerprint verification apparatus compares the query fingerprint image 1310 and each of the registered fingerprint images 1322, 1324, 1326, and 1328, and updates the matching region-based similarity based on the determined matching region and the second similarity corresponding to the matching region.

The matching region-based similarity is visually represented by a reference numeral 1330. In an example, the matching region-based similarity includes information associated with the matching region between the query fingerprint image 1310 and each of the registered fingerprint images 1322, 1324, 1326, and 1328, and corresponding second similarities. The determination of the matching region-based similarity is described in detail as follows.

As illustrated, the fingerprint verification apparatus determines a matching region 1332 between the query fingerprint image 1310 and the registered fingerprint image 1322, and a corresponding second similarity $S_1$. The fingerprint verification apparatus updates the matching region-based similarity by allocating the second similarity $S_1$ to the matching region 1332 of an entire region corresponding to the query fingerprint image 1310. In stage 1340, the fingerprint verification apparatus determines whether a score determined based on the matching region-based similarity satisfies a fingerprint verification condition. In an example, the score is a reference value used to determine whether fingerprint verification is successful.

When the score does not satisfy the fingerprint verification condition, the fingerprint verification apparatus compares the query fingerprint image 1310 and the registered fingerprint image 1324. The fingerprint verification apparatus determines a matching region 1334 between the query fingerprint image 1310 and the registered fingerprint image 1324, and a corresponding second similarity $S_2$. The fingerprint verification apparatus then updates the previously determined matching region-based similarity based on the matching region 1334 and the second similarity $S_2$. In stage 1340, the fingerprint verification apparatus determines whether a score determined based on the updated matching region-based similarity satisfies the fingerprint verification condition. When the score does not satisfy the fingerprint verification condition, the fingerprint verification apparatus performs the operations described in the foregoing on the registered fingerprint image 1326. The matching region-based similarity is then updated again based on a matching region 1336 between the query fingerprint image 1310 and the registered fingerprint image 1326 and a corresponding second similarity $S_3$.

As described above, the fingerprint verification apparatus may continuously update the matching region-based similarity by comparing the query fingerprint image 1310 and registered fingerprint images, for example, the registered fingerprint images 1322, 1324, 1326, and 1328, included in the target registered fingerprint image group in sequential order, until the fingerprint verification condition is satisfied. Whether the fingerprint verification condition is satisfied or not is determined each time the matching region-based similarity is updated, and thus rapid processing may be enabled because a fingerprint verification process is terminated after only some registered fingerprint images, instead of all the registered fingerprint images, is compared to the query fingerprint image 1310.

Although the example relates to determining whether the fingerprint verification condition is satisfied or not each time the matching region-based similarity is updated, in an example, the determining of whether the fingerprint verification condition is satisfied may be performed last. For example, all respective second similarities between the query fingerprint image 1310 and the registered fingerprint images 1322, 1324, 1326, and 1328 may be determined and a matching region-based similarity may be determined based on corresponding matching regions and the second similarities, and then whether the fingerprint verification condition is satisfied may be determined based on the determined matching region-based similarity.

The fingerprint verification apparatus may determine whether the fingerprint verification is successful based on various fingerprint verification conditions, and a scope of examples is not limited to the example described in the foregoing.

Figure 14:
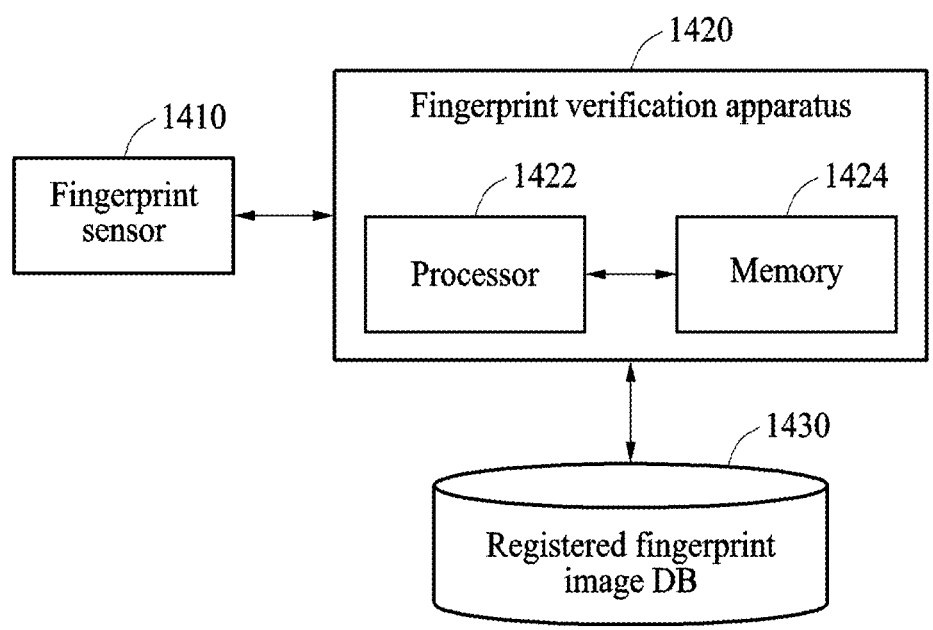
FIG. 14 is a diagram illustrating an example of a fingerprint verification apparatus.

FIG. 14 is a diagram illustrating an example of a fingerprint verification apparatus 1420, which may be configured to perform any one or combination or all operations described above.

Referring to FIG. 14, in an example, a fingerprint sensor 1410 obtains fingerprint information of a user attempting fingerprint verification, and generates a query fingerprint image based on the obtained fingerprint information. The generated query fingerprint image may be transferred to the fingerprint verification apparatus 1420, and the fingerprint verification apparatus 1420 may perform the fingerprint verification by comparing the query fingerprint image and at least one registered fingerprint image stored in a registered fingerprint image DB 1430. The user may register in advance at least one fingerprint image in a fingerprint registration process, and the registered fingerprint image may be stored in the registered fingerprint image DB 1430. According to an example, the fingerprint sensor 1410 may be included in the fingerprint verification apparatus 1420.

The fingerprint verification apparatus 1420 may perform one or more of the fingerprint verification operation described herein, and provide the user with a result of the fingerprint verification. The fingerprint verification apparatus 1420 may output the result of the fingerprint verification in a form of, for example, a voice, a vibration, a letter, an image, or a video. However, a scope of examples is not limited to the examples described in the foregoing, and the fingerprint verification apparatus 1420 may output the result of the fingerprint verification in various forms.

The fingerprint verification apparatus 1420 includes at least one processor 1422 and a memory 1424. The memory 1424 is a non-transitory computer readable medium or device connected to the processor 1422, and stores instructions, which when executed by the processor 1422, causing the processor 1422 to implement one or more or all operations described herein. The memory 1424 may further store data to be processed by the processor 1422 or data having been processed by the processor 1422. The memory 1424 includes, for example, a high-speed random access memory (RAM) and/or a nonvolatile computer-readable storage medium (e.g., at least one disk storage device, a flash memory device, or other nonvolatile solid state memory devices). Further description of the memory 1424 is provided below.

The processor 1422 may be configured to perform one or more or all operations described with reference to FIGS. 1, 2A, 2B, and 7 through 13. The processor 1422 may implement instructions to perform one or more or all operations in a fingerprint verification process. In one example, the processor 1422 may be configured to receive a query fingerprint image, and determine a first similarity between the query fingerprint image and each of registered fingerprint images. The processor 1422 may select a target registered fingerprint image group from registered fingerprint image groups based on the determined first similarity. For example, the processor 1422 may select, to be a target registered fingerprint image, a registered fingerprint image having a greatest first similarity among all the registered fingerprint images, and select a registered fingerprint image group including the selected target registered fingerprint image to be the target registered fingerprint image group. The processor 1422 may determine a second similarity between the query fingerprint image and each of registered fingerprint images included in the target registered fingerprint image group based on matching relationship information associated with a matching relationship between the registered fingerprint images included in the target registered fingerprint image group. For example, the processor 1422 may determine a second similarity between the query fingerprint image and the target registered fingerprint image, and then determine a second similarity between the query fingerprint image and another registered fingerprint image included in the target registered fingerprint image group based on a matching rotation angle between the query fingerprint image and the target registered fingerprint image and the matching relationship information. The processor 1422 may determine whether fingerprint verification of the query fingerprint image is successful based on the determined second similarity.

Figure 15:
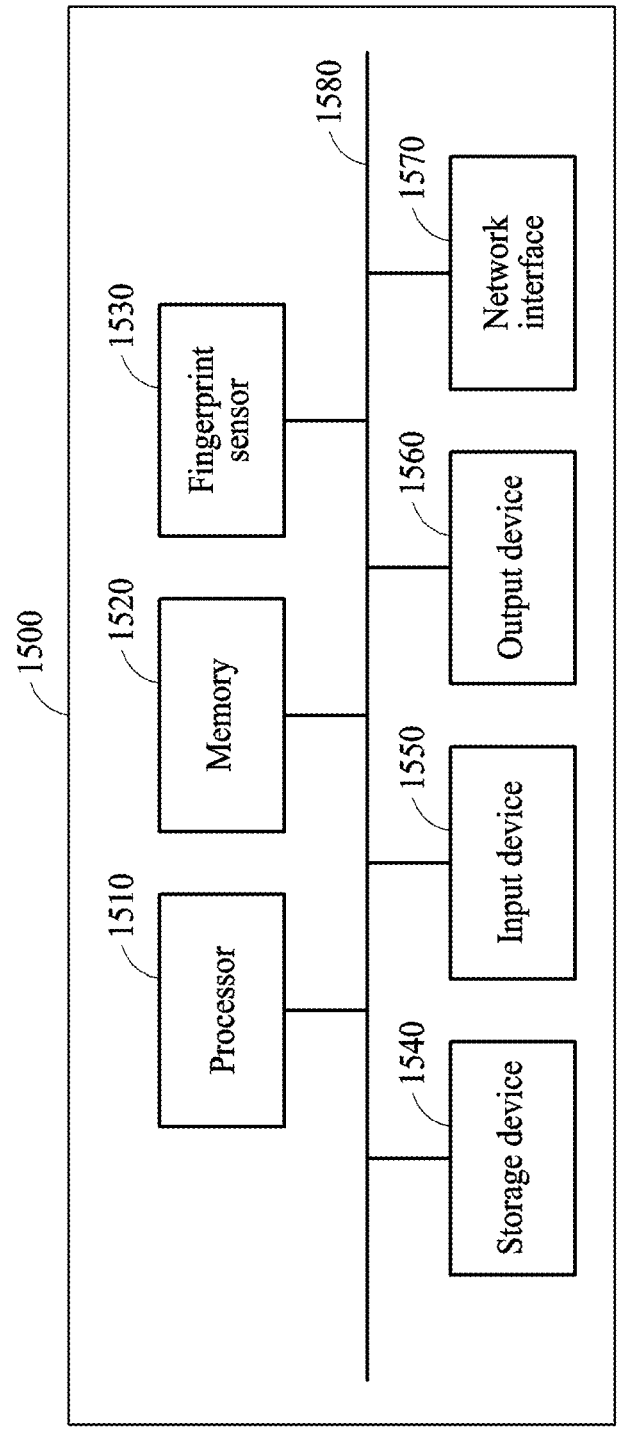
FIG. 15 is a diagram illustrating an example of a computing apparatus.

FIG. 15 is a diagram illustrating an example of a computing apparatus.

Referring to FIG. 15, a computing apparatus 1500 performs a fingerprint registration process and a fingerprint verification process. In the fingerprint registration process, the computing apparatus 1500 obtains fingerprint images of a user who desires to register fingerprints of the user, and generates a plurality of registered fingerprint image groups into which the obtained fingerprint images are classified. In an example, the computing apparatus 1500 determines matching relationship information associated with a matching relationship between registered fingerprint images included in each of the registered fingerprint image groups, and stores the determined matching relationship information along with the registered fingerprint images. In the fingerprint verification process, the computing apparatus 1500 obtains a fingerprint image of a user who attempts at fingerprint verification, and perform the fingerprint verification by comparing the obtained fingerprint image and the registered fingerprint images based on the matching relationship information determined in the fingerprint registration process.

The computing apparatus 1500 includes a processor 1510, a memory 1520, a fingerprint sensor 1530, a storage device 1540, an input device 1550, an output device 1560, and a network interface 1570. The processor 1510, the memory 1520, the fingerprint sensor 1530, the storage device 1540, the input device 1550, the output device 1560, and the network interface 1570 may communicate with one another through a communication bus 1580.

In response to a fingerprint input from a user, the fingerprint sensor 1530 may obtain a fingerprint image for fingerprint registration or fingerprint verification. For example, when a finger of the user touches a sensing region or a finger of the user swipes at the sensing region, the fingerprint sensor 1530 may sense a fingerprint of the finger. In another example, in a case in which the fingerprint sensor 1530 is integrated in a display, the sensing region may be represented by a surface of the display, and the fingerprint sensor 1530 may sense a fingerprint from a finger that is in contact with the display.

The processor 1510 may implement functions and instructions to operate in the computing apparatus 1500 as described herein. For example, the processor 1510 executes instructions stored in the memory 1520 or the storage device 1540. The processor 1510 may be configured to perform one or more, any combination, or all operations described with reference to FIGS. 1 through 14. For example, the processor 1510 may be configured to perform a fingerprint registration process and a fingerprint verification process. In the fingerprint registration process, the processor 1510 may perform fingerprint registration on a current fingerprint image obtained through the fingerprint sensor 1530. To perform the fingerprint registration, the processor 1510 may determine a similarity between the current fingerprint image and a previously registered fingerprint image, and classify registered fingerprint images into registered fingerprint image groups based on the determined similarity. For example, in response to the similarity between the current fingerprint image and the registered fingerprint image satisfying a preset condition, the processor 1510 may classify the current fingerprint image and the registered fingerprint image into a same registered fingerprint image group, and determine matching relationship information associated with a matching relationship between the current fingerprint image and a reference registered fingerprint image included in the registered fingerprint image group. The matching relationship information may include, for example, a matching rotation angle between the current fingerprint image and the reference registered fingerprint image, and a group identifier of the registered fingerprint image group that is assigned to the current fingerprint image. The processor 1510 may then store the determined matching relationship information in the storage device 1540. In the fingerprint verification process, the processor 1510 may perform one or more, any combination, or all operations that are performed by the fingerprint verification apparatus 1420 described with reference to FIG. 14, and thus a more detailed and repeated description will be omitted for brevity.

The storage device 1540 includes a computer-readable storage medium or a computer-readable storage device. The storage device 1540 may store a DB including registered fingerprint images and matching relationship information between the registered fingerprint images. The storage device 1540 includes, for example, a magnetic hard disk, an optical disc, a flash memory, an erasable programmable read-only memory (EPROM), a floppy disk, or other types of nonvolatile memories. Further description of the storage device 1540 is provided below.

The input device 1550 may receive an input from a user through a tactile, video, audio, or touch input. The input device 1550 includes, for example, a keyboard, a mouse, a touchscreen, a display, a microphone, a fingerprint reader, a retinal scanner, and other devices configured to detect the input from the user and transmit the detected input to the computing apparatus 1500.

The output device 1560 may provide a user with an output of the computing apparatus 1500 through a visual, auditory, or tactile channel. For example, the output device 1560 may visualize information related to the fingerprint verification and provide the user with the visualized information. For example, the visualized information may indicate whether the fingerprint verification is successful, or may enable access to further functions of the computing apparatus 1500 demonstrated through the visualized information. The output device 1560 includes, for example, a liquid crystal display (LCD), a light-emitting diode (LED) display, a touchscreen, a speaker, a vibration generator, and other devices configured to provide the output to the user.

The network interface 1570 may communicate with an external device through a wired or wireless network. The network interface 1570 includes, for example, an Ethernet card, an optical transceiver, a radio frequency transceiver, and other network interface cards configured to transmit and receive information. The network interface 1570 may wirelessly communicate with the external device using a communication method, such as, for example, Bluetooth, WiFi, or a third generation (3G), fourth generation (4G), or fifth generation (5G) communication method.

The computing apparatus 100, fingerprint verification apparatus 1420, computing apparatus 1500, and other apparatuses, units, modules, devices, and components illustrated in FIGS. 1, 14 and 15 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 3, 4, 7, 8, and 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A fingerprint verification method comprising:
receiving a query fingerprint image;
determining a first similarity between the query fingerprint image and each of registered fingerprint images;
selecting a target registered fingerprint image group from registered fingerprint image groups based on the first similarity;
determining a second similarity between the query fingerprint image and each of registered fingerprint images in the target registered fingerprint image group based on matching relationship information between the registered fingerprint images in the target registered fingerprint image group; and
determining whether fingerprint verification of the query fingerprint image is successful based on the second similarity.

2. The fingerprint verification method of claim 1, wherein the matching relationship information comprises information associated with a matching rotation angle between the registered fingerprint images in the target registered fingerprint image group, and the matching rotation angle is determined in a fingerprint registration process.

3. The fingerprint verification method of claim 1, wherein the selecting of the target registered fingerprint image group comprises:
selecting a target registered fingerprint image, which is a registered fingerprint image having a greatest first similarity among the registered fingerprint images; and
selecting, to be the target registered fingerprint image group, a registered fingerprint image group including the target registered fingerprint image.

4. The fingerprint verification method of claim 3, wherein the determining of the second similarity comprises:
determining a second similarity between the query fingerprint image and the target registered fingerprint image; and
determining a second similarity between the query fingerprint image and another registered fingerprint image included in the target registered fingerprint image group based on a matching rotation angle between the query fingerprint image and the target registered fingerprint image, and the matching relationship information.

5. The fingerprint verification method of claim 4, wherein the matching relationship information comprises a matching rotation angle between the target registered fingerprint image and a reference registered fingerprint image included in the target registered fingerprint image group, and a matching rotation angle between the reference registered fingerprint image and the other registered fingerprint image.

6. The fingerprint verification method of claim 3, wherein the determining of the second similarity comprises:
determining a matching rotation angle between the query fingerprint image and the target registered fingerprint image;
arranging the query fingerprint image and the target registered fingerprint image based on the determined matching rotation angle; and
determining a second similarity between the query fingerprint image and the target registered fingerprint image in a matching region in which the arranged query fingerprint image and the arranged target registered fingerprint image match each other.

7. The fingerprint verification method of claim 1, wherein the second similarity is determined with a greater computational complexity than used to determine the first similarity.

8. The fingerprint verification method of claim 1, wherein the determining of whether the fingerprint verification is successful comprises:
determining whether the fingerprint verification is successful based on a second similarity of a matching region between the query fingerprint image and at least one registered fingerprint image included in the target registered fingerprint image group.

9. A non-transitory computer-readable storage medium storing instructions, that when executed by processor, cause the processor to implement the method of claim 1.

10. A fingerprint verification apparatus comprising:
a processor configured to:
receive a query fingerprint image;
determine a first similarity between the query fingerprint image and each of registered fingerprint images;
select a target registered fingerprint image group from registered fingerprint image groups based on the first similarity;
determine a second similarity between the query fingerprint image and each of registered fingerprint images in the target registered fingerprint image group based on matching relationship information between the registered fingerprint images in the target registered fingerprint image group; and
determine whether fingerprint verification of the query fingerprint image is successful based on the second similarity.

11. The fingerprint verification apparatus of claim 10, wherein the processor is further configured to select a target registered fingerprint image, which is a registered fingerprint image having a greatest first similarity among the registered fingerprint images, and to select a registered fingerprint image group including the target registered fingerprint image to be the target registered fingerprint image group.

12. The fingerprint verification apparatus of claim 11, wherein the processor is further configured to determine a second similarity between the query fingerprint image and the target registered fingerprint image, and to determine a second similarity between the query fingerprint image and another registered fingerprint image included in the target registered fingerprint image group based on a matching rotation angle between the query fingerprint image and the target registered fingerprint image and the matching relationship information.

13. The fingerprint verification apparatus of claim 10, wherein the matching relationship information comprises information associated with a matching rotation angle between the registered fingerprint images in the target registered fingerprint image group, and the matching rotation angle is determined in a fingerprint registration process.

* * * * *